US012777357B2

(12) United States Patent
Zhang et al.

(10) Patent No.: US 12,777,357 B2
(45) Date of Patent: Oct. 27, 2026

(54) ELECTRONIC DEVICE AND METHOD FOR WIRELESS COMMUNICATION SYSTEMS, AND STORAGE MEDIA

(71) Applicant: Sony Group Corporation, Tokyo (JP)

(72) Inventors: Xuefei Zhang, Beijing (CN); Qingqing He, Beijing (CN); Fangxin Liu, Beijing (CN); Hanjie Li, Beijing (CN); Xu Han, Beijing (CN); Haojin Li, Beijing (CN); Tao Cui, Beijing (CN)

(73) Assignee: Sony Group Corporation, Tokyo (JP)

( * ) Notice: Subject to any disclaimer, the term of this patent is extended or adjusted under 35 U.S.C. 154(b) by 278 days.

(21) Appl. No.: 18/570,647

(22) PCT Filed: Jun. 20, 2022

(86) PCT No.: PCT/CN2022/099733
§ 371 (c)(1),
(2) Date: Dec. 15, 2023

(87) PCT Pub. No.: WO2022/268011
PCT Pub. Date: Dec. 29, 2022

(65) Prior Publication Data

US 2024/0292353 A1 Aug. 29, 2024

(30) Foreign Application Priority Data

Jun. 23, 2021 (CN) ......................... 202110695155.1

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/328* (2023.05); *H04W 24/02* (2013.01);
(Continued)

(58) Field of Classification Search
CPC ..... H04W 24/02; H04W 24/08; H04W 24/10; H04W 36/0058; H04W 36/0088;
(Continued)

(56) References Cited

U.S. PATENT DOCUMENTS

| | | | | |
|---|---|---|---|---|
| 5,539,748 A * | 7/1996 | Raith | .................. | H04W 68/025 455/515 |
| 10,979,979 B1 * | 4/2021 | Kong | ................ | H04W 56/0045 |

(Continued)

FOREIGN PATENT DOCUMENTS

| | | |
|---|---|---|
| CN | 111757338 A | 10/2020 |
| CN | 112469051 A | 3/2021 |

(Continued)

OTHER PUBLICATIONS

International Search Report and Written Opinion mailed on Aug. 29, 2022, received for PCT Application PCT/CN2022/099733, filed on Jun. 20, 2022, 13 pages including English Translation.

(Continued)

*Primary Examiner* — Brendan Y Higa
(74) *Attorney, Agent, or Firm* — XSENSUS LLP

(57) ABSTRACT

The present invention relates to electronic device and method for wireless communication system, and storage medium. An electronic device of a terminal device side for a wireless communication system, comprising: a processing circuit configured to: receive, from a base station, configuration information indicating that one or more of a plurality of synchronization signal blocks (SSBs) corresponding to the electronic device are measured when the electronic device is in an idle or inactive state, wherein the configuration information is sent on the basis that the electronic device is in a stationary state, and the configuration information comprises at least information indicating a first threshold; and in the period during which the electronic (Continued)

device is in the idle or inactive state, measure only the one or more of the plurality of SSBs having received signal strength higher than the first threshold when the electronic device is in a connected state.

14 Claims, 18 Drawing Sheets

(51) Int. Cl.
*H04W 24/02* (2009.01)
*H04W 24/08* (2009.01)
*H04W 52/02* (2009.01)

(52) U.S. Cl.
CPC ....... *H04W 24/08* (2013.01); *H04W 52/0245* (2013.01); *H04W 52/0254* (2013.01)

(58) Field of Classification Search
CPC ........... H04W 52/0245; H04W 52/0251–0258; H04W 68/02–0245
See application file for complete search history.

(56) References Cited

U.S. PATENT DOCUMENTS

| | | | | |
|---|---|---|---|---|
| 11,102,756 | B2 * | 8/2021 | Hsieh | H04B 17/318 |
| 12,022,398 | B2 * | 6/2024 | Yiu | H04W 36/0088 |
| 12,137,386 | B2 * | 11/2024 | Venkata | H04W 36/08 |
| 2008/0144580 | A1 * | 6/2008 | Su | H04W 48/16 370/332 |
| 2009/0209278 | A1 * | 8/2009 | Narang | H04W 48/16 455/522 |
| 2012/0252368 | A1 * | 10/2012 | Edara | H04W 24/10 455/67.11 |
| 2013/0084893 | A1 * | 4/2013 | Saito | H04W 24/10 455/458 |
| 2014/0269356 | A1 * | 9/2014 | Lai | H04W 36/0088 370/252 |
| 2015/0045020 | A1 * | 2/2015 | Wang | H04W 36/0088 455/434 |
| 2020/0068420 | A1 * | 2/2020 | Chen | H04W 36/0085 |
| 2021/0076275 | A1 * | 3/2021 | Yiu | H04W 36/0088 |
| 2021/0105647 | A1 * | 4/2021 | Lee | H04W 36/0094 |
| 2021/0105649 | A1 * | 4/2021 | Lee | H04W 24/10 |
| 2021/0167874 | A1 * | 6/2021 | Jiang | H04W 48/18 |
| 2021/0345294 | A1 * | 11/2021 | Hsieh | H04B 17/318 |
| 2021/0392525 | A1 * | 12/2021 | Kaikkonen | H04W 24/08 |
| 2022/0007293 | A1 * | 1/2022 | Kaikkonen | H04B 17/309 |
| 2022/0082649 | A1 * | 3/2022 | Duan | H04W 52/0216 |
| 2022/0124526 | A1 * | 4/2022 | Lee | H04W 36/0072 |
| 2022/0150726 | A1 * | 5/2022 | Laselva | H04B 7/088 |
| 2022/0361019 | A1 * | 11/2022 | Laselva | H04B 7/0834 |
| 2023/0146103 | A1 * | 5/2023 | Cheng | H04L 5/0048 370/252 |
| 2023/0412290 | A1 * | 12/2023 | Gursu | H04B 17/328 |
| 2024/0224103 | A1 * | 7/2024 | Koskinen | H04W 24/10 |

FOREIGN PATENT DOCUMENTS

| | | | | |
|---|---|---|---|---|
| CN | 112752272 | A | 5/2021 | |
| CN | 113840359 | A | 12/2021 | |
| EP | 3442254 | A1 * | 2/2019 | H04W 36/0088 |
| WO | 2020/197861 | A2 | 10/2020 | |
| WO | 2020/252684 | A1 | 12/2020 | |
| WO | 2021/020952 | A1 | 2/2021 | |
| WO | 2021/035238 | A1 | 2/2021 | |
| WO | 2021/101668 | A1 | 5/2021 | |

OTHER PUBLICATIONS

Mediatek Inc. et al., "Discussion on SSB measurement requirements", 3GPP TSG-RAN WG4 NR AH-1801, R4-1800110, Jan. 22-26, 2018, 6 pages.
OPPO: "Discussion on RRM relax for RedCap UEs", 3GPP Draft; R2-2102737, 3rd Generation Partnership Project (3GPP), Apr. 12, 2021-Apr. 20, 2021 Apr. 2, 2021, 3 pgd., vol. RAN WG2, No. electronic; France, XP052174340.
ZTE Corporation: "Email discussion 155—RRM Relaxations", 3GPP Draft; R2-2100569, 3rd Generation Partnership Project (3GPP), Jan. 25, 2021-Feb. 5, 2021 Jan. 15, 2021, 35 pgs., vol. RAN WG2, No. Electronic Meeting, XP051973703.

* cited by examiner

ELECTRONIC DEVICE AND METHOD FOR WIRELESS COMMUNICATION SYSTEMS, AND STORAGE MEDIA

CROSS-REFERENCE TO RELATED APPLICATIONS

The present disclosure is based on PCT filing PCT/CN2022/099733, filed Jun. 20, 2022, which claims priority from Chinese Patent Application No. 202110695155.1, filed Jun. 23, 2021, the entire contents of each are incorporated herein by reference.

TECHNICAL FIELD

The present disclosure generally relates to a wireless communication system, and specifically relates to techniques related to energy saving for terminal devices under an idle (IDLE)/inactive (INACTIVE) state.

BACKGROUND

With the development of communication technologies, terminal devices are used in more and more scenarios. For example, in 5G NR, a terminal device called a Reduced Capability NR Device is being discussed. This kind of terminal device is mainly used in three scenarios: an industrial wireless sensor network, video surveillance and wearable devices. One of the common features of these three scenarios is the requirement to minimize the power consumption and extend the battery life.

For example, for the scenario of wearable devices, according to the statistics of 4G smart watches, the time ratio of their idle state is about 90%, and generally in this scenario, the battery is required to be used for several days to several weeks after a single charge. As another example, industrial wireless sensors may have an idle state time ratio higher than 90%, and generally in this scenario, the battery is required to be usable for at least several years after a single charge.

In view of the above, there is a need for a technology capable of reducing the energy consumption of a terminal device, especially the energy consumption of the terminal device under an idle state or an inactive state.

SUMMARY

The present disclosure proposes a solution related to energy saving of a terminal device under a Radio Resource Control (RRC) idle state or an inactive state (hereinafter referred to as idle state or inactive state). Specifically, the present disclosure provides a electronic device, a method and a storage media for a wireless communication system.

An aspect of the present disclosure relates to an electronic device for a terminal device side of a wireless communication system, comprising: a processing circuitry, configured to: receive, from abase station, configuration information indicating performing measurement on one or more Synchronization Signal Blocks, SSBs of a plurality of SSBs corresponding to the electronic device when the electronic device is under an idle state or an inactive state, wherein the configuration information is transmitted based on the electronic device being in a stationary status, and the configuration information at least comprises information indicating a first threshold; and perform measurement, during the electronic device being under the idle state or the inactive state, only on one or more SSBs of the plurality of SSBs which have received signal strength higher than the first threshold when the electronic device is under a connected state.

Another aspect of the present disclosure relates to a method for a terminal device side of a wireless communication system, comprising: receiving, from a base station, configuration information indicating performing measurement on one or more Synchronization Signal Blocks, SSBs of a plurality of SSBs corresponding to the electronic device when the electronic device is under an idle state or an inactive state, wherein the configuration information is transmitted based on the electronic device being in a stationary status, and the configuration information at least comprises information indicating a first threshold; and performing measurement, during the electronic device being under the idle state or the inactive state, only on one or more SSBs of the plurality of SSBs which have received signal strength higher than the first threshold when the electronic device is under a connected state.

Another aspect of the present disclosure relates to an electronic device for a control device side of a wireless communication system, comprising: a processing circuitry configured to: determine if a terminal device is in a stationary status; and in response to determining the terminal device is in the stationary status, transmit, to the terminal device, configuration information indicating performing measurement on one or more Synchronization Signal Blocks, SSBs of a plurality of SSBs corresponding to the terminal device when the terminal device is under an idle state or an inactive state, wherein the configuration information at least comprises information indicating a first threshold, such that the terminal device performs measurement, during the terminal device being under the idle state or the inactive state, only on one or more SSBs of the plurality of SSBs which have received signal strength higher than the first threshold when the terminal device is under a connected state.

Another aspect of the present disclosure relates to a method for a control device side of a wireless communication system, comprising: determining if a terminal device is in a stationary status; and in response to determining the terminal device is in the stationary status, transmitting, to the terminal device, configuration information indicating performing measurement on one or more Synchronization Signal Blocks, SSBs of a plurality of SSBs corresponding to the terminal device when the terminal device is under an idle state or an inactive state, wherein the configuration information at least comprises information indicating a first threshold, such that the terminal device performs measurement, during the terminal device being under the idle state or the inactive state, only on one or more SSBs of the plurality of SSBs which have received signal strength higher than the first threshold when the terminal device is under a connected state.

Another aspect of the present disclosure relates to an electronic device for a terminal device side of a wireless communication system, comprising: a processing circuitry configured to: receive, from a base station, configuration information indicating performing measurement on one or more Synchronization Signal Blocks, SSBs corresponding to the electronic device when the electronic device is under an idle state or an inactive state, wherein the configuration information is transmitted based on the terminal device being in a stationary status, the configuration information at least comprises information indicating SSB measurement timing and information indicating a first threshold, and the SSB measurement timing is within a paging period of every N paging periods, N being an integer greater than 1; and perform the following operations during the electronic device being under the idle state or the inactive state: performing measurement on the one or more SSBs according to the SSB measurement timing, and performing measurement on the one or more SSBs in every paging period in response to a variation of received signal strength of any of the measured one or more SSBs with respect to received signal strength measured at a previous time being higher than the first threshold.

Another aspect of the present disclosure relates to a method for a terminal device side of a wireless communication system, comprising: receiving, from a base station, configuration information indicating performing measurement on one or more Synchronization Signal Blocks, SSBs corresponding to the electronic device when the electronic device is under an idle state or an inactive state, wherein the configuration information is transmitted based on the terminal device being in a stationary status, and the configuration information at least comprises information indicating SSB measurement timing and information indicating a first threshold, and the SSB measurement timing is within a paging period of every N paging periods, N being an integer greater than 1; and during the electronic device being under the idle state or the inactive state: performing measurement on the one or more SSBs according to the SSB measurement timing, and performing measurement on the one or more SSBs in every paging period in response to a variation of received signal strength of any of the measured one or more SSBs with respect to received signal strength measured at a previous time being higher than the first threshold.

Another aspect of the present disclosure relates to an electronic device for a control device side of a wireless communication system, comprising: a processing circuitry configured to: determine if a terminal device is in a stationary status; and in response to determining the terminal device is in the stationary status, transmit, to the terminal device, configuration information indicating performing measurement on one or more Synchronization Signal Blocks, SSBs corresponding to the terminal device when the terminal device is under an idle state or an inactive state, wherein the configuration information at least comprises information indicating SSB measurement timing and information indicating a first threshold, and the SSB measurement timing is within a paging period of every N paging periods, N being an integer greater than 1, such that the terminal device, during being under the idle state or the inactive state: performs measurement on the one or more SSBs according to the SSB measurement timing, and performs measurement on the one or more SSBs in every paging period in response to a variation of received signal strength of any of the measured one or more SSBs with respect to received signal strength measured at a previous time being higher than the first threshold.

Another aspect of the present disclosure relates to a method for a control device side of a wireless communication system, comprising: determining if a terminal device is in a stationary status; and in response to determining the terminal device is in the stationary status, transmitting, to the terminal device, configuration information indicating performing measurement on one or more Synchronization Signal Blocks, SSBs corresponding to the terminal device when the terminal device is under an idle state or an inactive state, wherein the configuration information at least comprises information indicating SSB measurement timing and information indicating a first threshold, and the SSB measurement timing is within a paging period of every N paging periods, N being an integer greater than 1, such that the terminal device, during being under the idle state or the inactive state: performs measurement on the one or more SSBs according to the SSB measurement timing, and performs measurement on the one or more SSBs in every paging period in response to a variation of received signal strength of any of the measured one or more SSBs with respect to received signal strength measured at a previous time being higher than the first threshold.

Another aspect of the present disclosure relates to a non-transitory computer-readable storage medium having executable instructions stored thereon, which, when executed, implement the methods as described in the above aspects.

Another aspect of the present disclosure relates to a device. The device comprises: a processor and a storage having executable instructions stored thereon, which, when executed, implement the methods as previously described.

The above summary is provided to summarize some exemplary embodiments in order to provide a basic understanding to various aspects of the subject matter described herein. Therefore, above features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be obtained when the following detailed description of embodiments is considered in conjunction with the accompanying drawings. The same or similar reference signs are used throughout various drawings to denote the same or similar components. The accompanying drawings, along with the following detailed description, are incorporated in and constitute apart of this specification, to illustrate embodiments of the disclosure and to explain the principles and advantages of the disclosure. Wherein.

Figure 1:
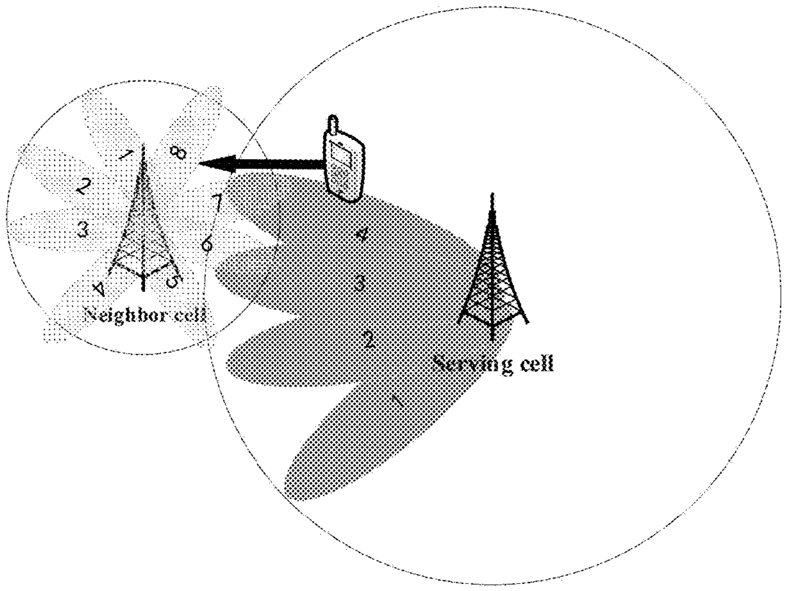
FIG. 1 schematically illustrates a beam coverage relation among a terminal device under a stationary status and a base station of a serving cell and a base station of a neighbor cell.

While the embodiments described in this disclosure may be susceptible to various modifications and alternatives, specific embodiments thereof are illustrated by way of example in the accompanying drawings and are described in detail herein. It should be understood, however, that the drawings and detailed description thereof are not intended to limit the embodiments to the particular forms disclosed; rather, it is intended to cover all modifications, equivalents and alternatives falling within the spirit and scope of the claims.

DETAILED DESCRIPTION

The following describes representative applications of various aspects of the device and method according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Typically, a wireless communication system includes at least a control device and a terminal device, and the control device can provide communication services for one or more terminal devices.

In this disclosure, the term "base station" or "control device" has the full breadth of its ordinary meaning and includes at least a wireless communication station that is a part of a wireless communication system or radio system to facilitate communication. As an example, a base station may be an eNB of the 4G communication standard, a gNB of the 5G communication standard, a remote radio head, a wireless access point, a drone control tower, or a communication apparatus performing similar functions. In this disclosure, "base station" and "control device" may be used interchangeably, or "control device" may be implemented as a part of "base station". Application examples of the base station/terminal device will be described in detail below by taking the base station as an example in conjunction with the accompanying drawings.

In this disclosure, the term "terminal device" or "user equipment (UE)" has the full breadth of its ordinary meaning and includes at least a terminal device that is a part of a wireless communication system or radio system to facilitate communication. As an example, a terminal device may be, for example, a mobile phone, a laptop, a tablet, a vehicle-mounted communication device, a wearable device, a sensor, or the like, or a component thereof. In this disclosure, "terminal device" and "user equipment" (hereinafter may be simply referred to as "UE") may be used interchangeably, or "terminal device" may be implemented as a part of "user equipment".

In this disclosure, the terms "control device side"/"base station side" have the full breadth of their ordinary meaning, generally indicating the side of a communication system downlink that transmits data. Similarly, the terms "terminal device side"/"user equipment side" have the full breadth of their ordinary meaning and may accordingly indicate the side of the communication system downlink that receives data.

It should be noted that, although embodiments of the present disclosure are mainly described below based on a communication system including a base station and a user equipment, these descriptions can be correspondingly extended to situations of communication systems including any other type of control device side and terminal device side. For example, for the case of downlink, operations on a control device side may correspond to operations of a base station, while operations of a user equipment side may accordingly correspond to operations of a terminal device.

Traditionally, in NR, after a UE enters an IDLE/INACTIVE state, paging and SSB measurement are periodically performed at each Paging Occasion (PO) in the case of high signal to noise ratio. The purpose of paging is mainly to monitor whether there is an incoming paging message, system information change(s), or whether the UE can stop monitoring PDCCH (Physical Downlink Control Channel) monitoring occasions corresponding to each SSB in the case of shared spectrum channel access. The purpose of performing SSB measurement is mainly to perform synchronization to ensure reliable reception of PDCCH and PDSCH, and to perform cell quality measurement based on the SSB measurement to perform cell selection/reselection when necessary. It should be noted that, a UE generally needs to perform measurement on a plurality of SSBs corresponding to the UE, each SSB corresponding to a beam, and the plurality of SSBs include a plurality of SSBs corresponding to a communication link between the UE and a base station of a serving cell and a plurality of SSBs corresponding to communication links between the UE and base stations of one or more neighbor cells.

However, for some UEs with low mobility, such as the reduced capability NR devices mentioned in the BACKGROUND, this disclosure pays attention to the following two aspects to reduce power consumption:

On the one hand, since the UE is substantially stationary (e.g., there is substantially no displacement or rotation), the UE can be considered to be in a relatively fixed beam coverage area, and furthermore, it may be unnecessary to perform measurement on SSBs corresponding to some beams with weak received signal strengths under an idle or inactivity state and may lead to a waste of power. As shown in FIG. 1, traditionally, the UE needs to measure a plurality of beams corresponding to it, for example, beams 1-4 of the base station of the serving cell and beams 1-8 of the base station of the neighbor cell. However, if the UE is substantially stationary, it may be unnecessary to perform measurement on the SSB corresponding to any of the beams 1-4 of the neighbor cell, since the orientations of these beams are not directed at the UE, and thus even if those SSB are measured, received signal strengths thereof may be very weak and thus not helpful to the possible cell selection/reselection. Therefore, it may be considered to reduce the number of SSBs to be measured.

On the other hand, as introduced above, the purpose of performing SSB measurement is mainly to perform synchronization and perform cell quality measurement based on the SSB measurement to perform cell selection/reselection when necessary. Since the UE is substantially stationary (for example, there is substantially no displacement or rotation), the probability that the UE needs to perform cell reselection is relatively low. In addition, time drift caused by a local oscillator is very slow, so even if the time between two SSB measurements is extended (in other words, the SSB measurement period is extended), the UE can still maintain good synchronization. Therefore, it may be considered to extend the SSB measurement period under the idle state or the inactive state, for example, perform one time of SSB measurement in multiple paging periods.

In view of both of above aspects, the present disclosure proposes a solution for reducing energy consumption of a terminal device under an idle state or an inactive state by performing relaxation measurement on SSBs.

First Embodiment

According to a first embodiment of the present disclosure, a base station can transmit, to a UE under a stationary status, reception of configuration information indicating performing measurement on one or more SSBs of a plurality of SSBs corresponding to the UE when the UE is under an idle state or an inactive state. The configuration information may include, for example, at least information indicating a strength threshold, so as to instruct the UE to perform, during the idle state or the inactive state, measurement only on one or more SSBs of the plurality of SSBs which have received signal strength higher than the strength threshold when the UE is under a RRC connected state (hereinafter referred to as connected state).

The first embodiment will be described in detail below with reference to FIGS. 2-8.

Structure and Operation Flow of the UE According to the First Embodiment of the Present Disclosure A conceptual structure of an electronic device 10 for a terminal device/user device according to an embodiment of the present disclosure will be described below with reference to FIG. 2.

Figure 2:
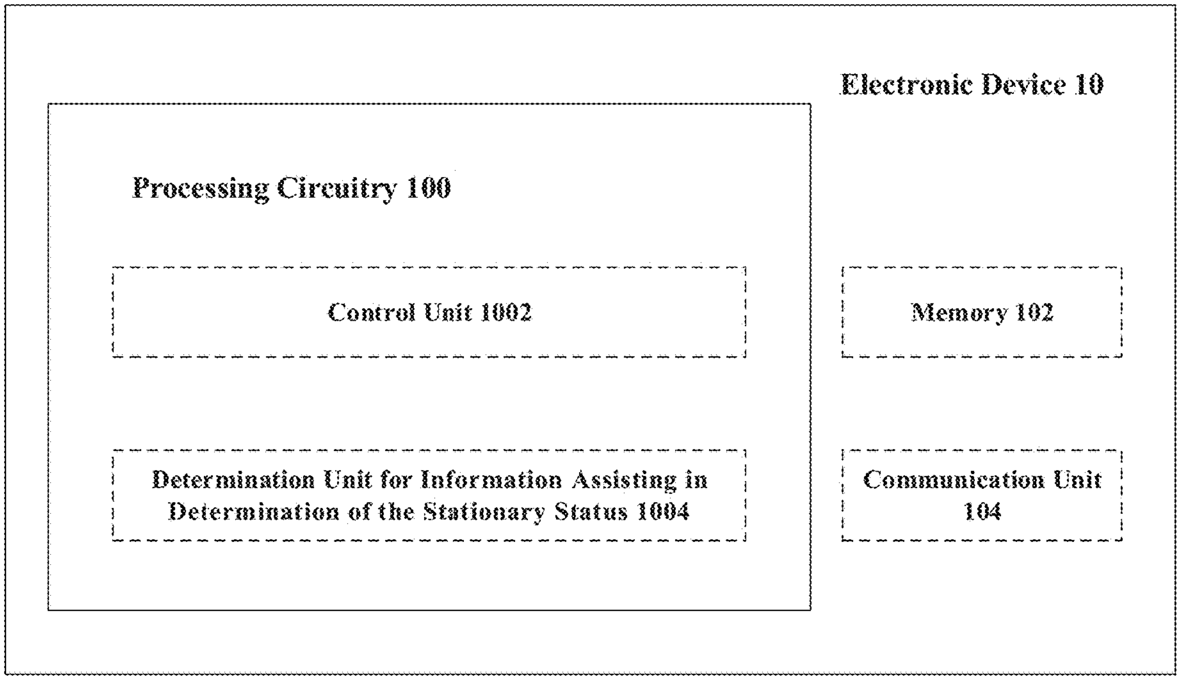
FIG. 2 schematically illustrates a conceptual configuration of an electronic device on a terminal device side according to a first embodiment of the present disclosure.

As shown in FIG. 2, the electronic device 10 may include a processing circuitry 100. The processing circuitry 100 may be configured to receive, from a base station, configuration information indicating performing measurement on one or more SSBs of a plurality of SSBs corresponding to the electronic device 10 when the electronic device 10 is under an idle state or an inactive state, wherein, the configuration information is transmitted based on the electronic device 10 being in a stationary status, and the configuration information at least comprises information indicating a strength threshold; and, the processing circuitry 100 is further configured to perform measurement, during the electronic device 10 being under the idle state or the inactive state, only on one or more SSBs of the plurality of SSBs which have received signal strength higher than the strength threshold when the electronic device 10 is under a connected state.

The processing circuitry 100 may be in the form of a general-purpose processor or a special-purpose processing circuit, such as an ASIC. For example, the processing circuitry 100 can be constructed by a circuit (hardware) or a central processing device (such as, a Central Processing Unit (CPU)). In addition, a program (software) for operating the circuit (hardware) or the central processing device may be carried on the processing circuitry 100. The program can be stored in a memory (such as arranged in a memory 201) or an external storage medium connected from outside, and downloaded via a network (such as the Internet).

In one implementation, the processing circuitry may comprise a control unit 1002 controlling SSB measurement based on configuration information received from a base station. For example, the control unit 1002 may be configured to control the electronic device 10 to perform measurement on one or more SSBs selectively. In addition, the control unit 1002 can also monitor SSB measurements, so as to control to transition to non-selective SSB measurement at an appropriate time, that is, to transition to perform measurement on each SSB of the plurality of SSBs corresponding to the electronic device 10. The processing circuitry may further include a determination unit 1004 for information assisting in determination of the stationary status, which may be configured to assist the base station in determining information whether the electronic device 10 is in a stationary status.

In addition, the processing circuitry 100 may further include an interface circuit (not shown) for interfacing between various units.

Optionally, the electronic device 10 may further include a memory 102 and a communication unit 104 shown in dotted lines in the figure. In addition, the electronic device 10 may further include other components not shown, such as a radio frequency link, a baseband processing unit, a network interface, a processor, a controller, a display, and the like. The processing circuitry 100 may be associated with the memory 102 and/or the communication unit 104. For example, the processing circuitry 100 may be directly or indirectly (e.g., other components may be connected therebetween) connected to the memory 102 for data access. For another example, the processing circuitry 100 may be directly or indirectly connected to the communication unit 104 to transmit radio signals via the communication unit 104 and to receive radio signals via the communication unit 104.

The memory 102 can store various information generated by the processing circuitry 100 (for example, measurement (s) of one or more SSBs and information assisting in determination of the stationary status, etc.), programs and data for operations of the electronic device 10, data to be transmitted by the communication unit 104, etc. The memory 102 is drawn with dashed lines because it could also be located within the processing circuitry 100 or external to the electronic device 10. The memory 102 may be a volatile memory and/or a non-volatile memory. For example, the memory 102 may include, but is not limited to, a random access memory (RAM), a dynamic random access memory (DRAM), a static random access memory (SRAM), a read only memory (ROM), and a flash memory.

The communication unit 104 may be configured to communicate with a base station under the control of the processing circuitry 100. In one example, the communication unit 104 may be implemented as a transmitter or a transceiver, including communication components such as an antenna array and/or a radio frequency link. In one embodiment, the communication unit 104 may receive configuration information related to SSB measurement in the idle state or the inactive state transmitted by a base station. In one example, the communication unit 104 may also transmit information assisting in determination of the stationary status to a base station to help the base station determine whether the electronic device 10 is under the stationary status.

Although the processing circuitry 100 is shown as being separate from the communication unit 104 in FIG. 2, the processing circuitry 100 may also be implemented to include the communication unit 104. Furthermore, the processing circuitry 10 may also be implemented to include one or more other components in the electronic device 10, or the processing circuitry 200 may be implemented as the electronic device 10 itself. In actual implementation, the processing circuitry 100 may be implemented as a chip (such as an integrated circuit module comprising a single wafer), a hardware component, or a complete product.

It should be noted that the above units are only logical modules divided according to specific functions they implement, and are not used to limit specific implementations, for example, they can be implemented in software, hardware, or a combination of software and hardware. In practical implementations, each of the above units may be implemented as an independent physical entity, or may also be implemented by a single entity (for example, a processor (CPU or DSP, etc.), integrated circuit, etc.). In addition, each of the above units is shown with dotted lines in the drawings to indicate that these units may not actually exist, and the operations/functions they realized may be realized by the processing circuitry itself.

Figure 3A:
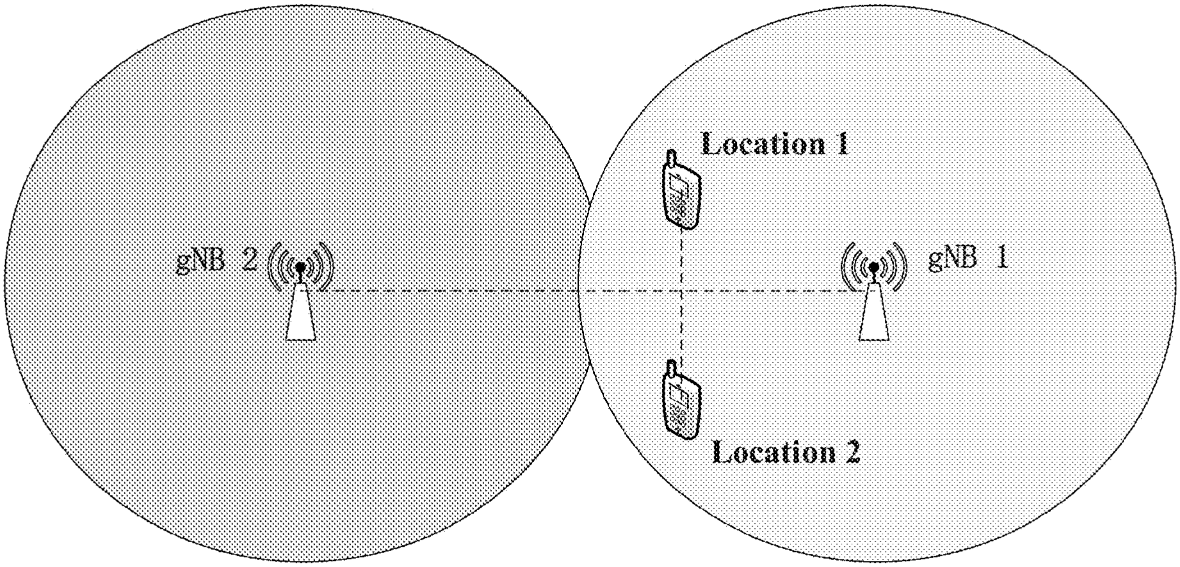
FIG. 3A schematically illustrates a schematic diagram of determining a stationary status of a terminal device according to an embodiment of the present disclosure.

The operations implemented by the electronic device 10 will be described below with reference to FIGS. 3A-3B and FIG. 4.

As briefly introduced above, a base station can transmit, to a UE, configuration information indicating performing measurement on one or more SSBs of a plurality of SSBs corresponding to the UE when the UE is under an idle state or an inactive state, so as to instruct the UE to perform, during the idle state or the inactive state, measurement only on one or more SSBs of the plurality of SSBs which have received signal strength higher than a strength threshold when the UE is under a connected state. Such configuration information may be transmitted based on the UE being in a stationary status.

According to the present disclosure, the stationary status indicates, for example, that the UE was not displaced and was not rotated within a predetermined time, in other words, the UE was not moved in any direction and was not rotated along any axis.

According to the present disclosure, the base station can determine whether the UE is stationary according to information transmitted by the UE to the base station under the connected state.

For example, when the UE is under a connected state, it may transmit a measurement report on the SSB to the base station of the serving cell, and the measurement report may indicate received signal strength (such as, Reference Signal Receiving Power (RSRP), Reference Signal Receiving Quality (RSRQ), Received Signal Strength Indication etc.) of corresponding SSB(s) (for example, a plurality of SSBs) received by the UE from the base station of the serving cell and received signal strength of corresponding SSB(s) (for example, plurality of SSBs) received by the UE from base stations of one or more neighbor cells.

According to the present disclosure, the base station may determine whether the UE is stationary at least according to the above measurement report transmitted by the UE to the base station under the connected state.

For example, the base station may determine, according to the above measurement report, whether a variation of received signal strength of each SSB of corresponding SSBs received by the UE from the base station of the serving cell and a variation of received signal strength of each SSB of corresponding SSBs received by the UE from base stations of two neighbor cells are both less than a predetermined threshold within a predetermined time period when the UE is under the connected state. If the variation of the received signal strength of each SSB of corresponding SSBs received by the UE from the base station of the serving cell and the variation of the received signal strength of each SSB of corresponding SSBs received by the UE from the base stations of the two neighbor cells are both less than the predetermined threshold, it can be determined that the UE is not displaced. The base station may configure any appropriate value for the predetermined threshold as appropriate, for example.

In particular, it is noticed in the present disclosure that it is not enough to determine whether a UE is displaced merely according to whether a variation of received signal strength of each SSB received by the UE from the base station of the serving cell is less than a predetermined threshold. This is because received signal strength of a SSB may remain constant when the UE moves in a circle around the base station of the serving cell. In addition, the present disclosure further notices that it is also not enough to determine whether a UE is displaced merely according to whether a variation of received signal strength of each SSB received by the UE from the base station of the serving cell and one base station of a neighbor cell is less than a predetermined threshold. This is because received signal strength of a SSB may remain constant when the UE undergoes a symmetrical displacement in the coverage areas of the base station of the serving cell and the base station of the neighbor cell. As shown in FIG. 3 A, the UE moves from position 1 to position 2, and these two positions are symmetrical with respect to the connection line between the base station of the serving cell and the base station of the neighbor cell, and thereby the distances to the base station of the serving cell and the base station of the neighbor cell are the same. Therefore, in order to improve the accuracy of the determination, the present disclosure further uses the variations of the received signal strength of the SSBs received by the UE from base stations of two neighbor cells to determine whether the UE is displaced.

Figure 3B:
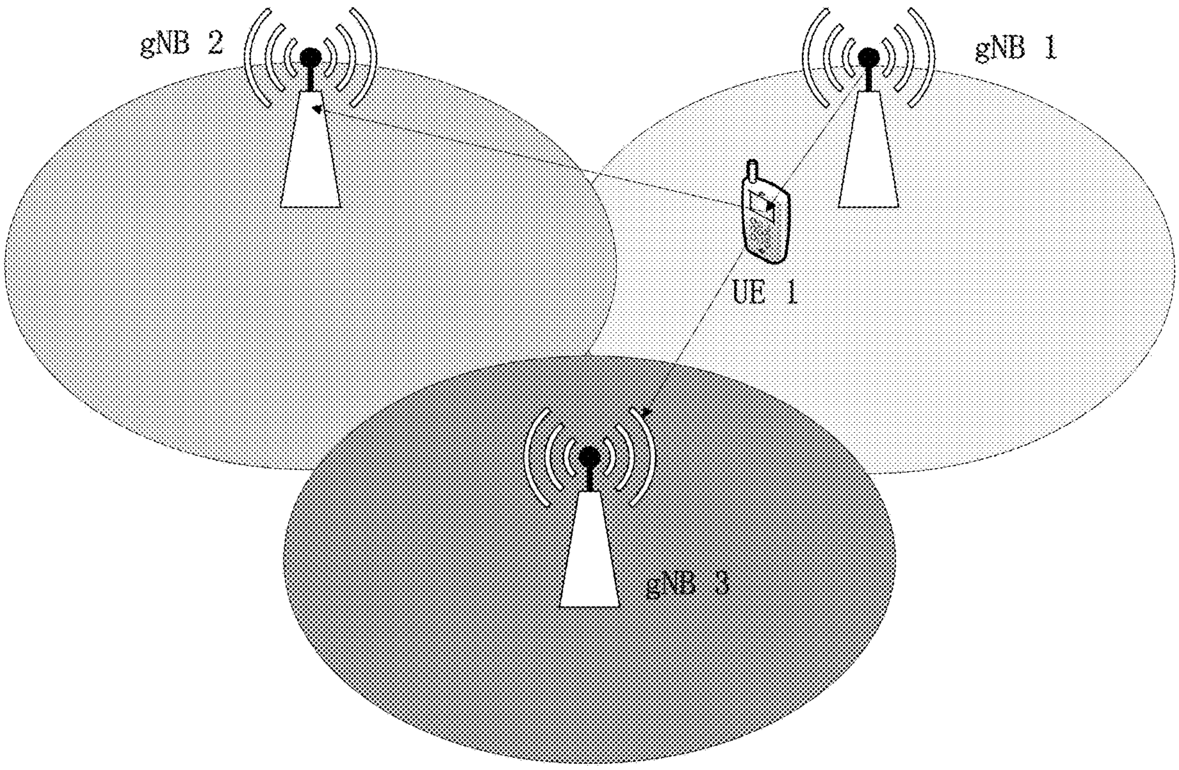
FIG. 3B schematically illustrates a symmetrical displacement of a UE.

FIG. 3B schematically illustrates a schematic diagram of determining whether a UE is displaced according to the present disclosure. As shown in FIG. 3B, gNB1 is the base station of the serving cell of UE1, and gNB2 and gNB3 are base stations of two neighbor cells respectively. When gNB1 determines, based on a measurement report from the UE1, that variations of received signals of SSBs from the three base stations for UE1 are all less than a predetermined threshold, it may be determined that UE1 is not displaced.

For another example, the base station may determine, according to the above measurement report, whether a magnitude relation among received signal strength of the corresponding SSBs received by the UE from the base station of the serving cell and a magnitude relation among received signal strength of corresponding SSBs received by the UE from a base station of a neighbor cell are both substantially unchanged within a predetermined time period when the UE is under the connected state. If the magnitude relation among received signal strength of the corresponding SSBs received by the UE from the base station of the serving cell and the magnitude relation among received signal strength of the corresponding SSBs received by the UE from the base station of the neighbor cell are both substantially unchanged, it may be determined that the UE is not rotated.

Specifically, as described above with reference to FIG. 1, the UE may need to measure beams 1-4 of the base station of the serving cell and beams 1-8 of the base station of the neighbor cell. If within a predetermined time, the magnitude relation among received signal strength of the SSBs corresponding to beams 1-4 received by the UE from the base station of the serving cell is substantially unchanged, and the magnitude relation among received signal strength of the SSBs corresponding to beams 1-8 received from the base station of the neighbor cell is substantially unchanged, it may be determined that the UE is not rotated. Here, "magnitude relation is substantially unchanged" means that the relative magnitude relation among the SSBs remains unchanged, but the value of each SSB itself can be changed to a certain extent. For example, taking the base station of the serving cell in FIG. 1 as an example, if within a predetermined time, the received signal strength of the SSB corresponding to beam 1-4 received by the UE from the base station remains as: the received signal strength of the SSB corresponding to beam 4 being highest, followed by beam 3, then beam 2, and finally beam 1, even if the value of received signal strength of each SSB itself has a certain magnitude of change (for example, the magnitude of change is less than the predetermined threshold used to determine whether the UE is displaced), it can still be determined that the magnitude relation among the received signal strength of the corresponding SSBs received by the UE from the base station of the serving cell is substantially unchanged.

It should be noted that, the above example taking the SSB as a downlink reference signal illustrates determining whether the UE is stationary by using received signal strengths of downlink reference signals of a base station of a serving cell and a base station of a reference cell. However, the present invention is not limited to using SSB, and other suitable downlink reference signals may also be used. For example, the UE may also transmit a measurement report of a Channel State Information-Reference Signal (CSI-RS) to the base station, and the base station may determine whether the UE is displaced based on the measurement report of the CSI-RS.

In addition to the SSB measurement report transmitted by the UE to the base station when the UE is under the connected state, the base station may further determine whether the UE is stationary based on information assisting in determination of the stationary status transmitted by the UE. The information assisting in determination of the stationary status may at least include, for example, information indicating the type of the UE and/or information related to received signal strength of historical downlink reference signals. The information assisting in determination of the stationary status may be transmitted to the base station together with the measurement report on the SSB, or may be transmitted to the base station as individual information separately from the measurement report.

For example, a UE may transmit information indicating the type of the UE, such as a mobile phone, a laptop, a tablet, a vehicle-mounted communication device, an industrial sensor, a wearable device, a video surveillance device, etc., to the base station. When the type indicates that the UE is a device of a substantially stationary type, for example, when the type is one of an industrial sensor, a wearable device and a video surveillance device, it can assist the base station to determine more easily that the UE is most likely to be in a stationary status. In addition, with the help of the information indicating the type of UE, the base station can determine more accurately whether the UE is in a stationary status. For example, assuming that the base station determines that the UE is not displaced or rotated for a time period based on the SSB measurement report reported by the UE, and meanwhile, the base station determines that the UE is a vehicle-mounted communication device based on the information received from the UE indicating the type of the UE, then the base station can appropriately extend the time period for determining the stationary status of the UE, in case the UE is wrongly determined to be in the stationary status just because the vehicle is temporarily stationary.

Additionally or alternatively, the UE may transmit information related to received signal strength of historical downlink reference signals to the base station. For example, the UE may transmit historical measurements of downlink reference signals, such as a Channel State Information-Reference Signal (CSI-RS), to the base station, so as to assist the base station to determine more accurately whether the UE is stationary.

According to the present disclosure, in response to the base station determining that the UE is in a stationary status, for example, when the UE is about to transition from the connected state to the idle state or the inactive state, the base station may transmit, to the UE, configuration information indicating performing measurement on one or more SSBs of a plurality of SSBs corresponding to the UE when the UE is under the idle state or the inactive state. For example, the base station may transmit the configuration information to the UE using an RRC Release signaling. For example, the configuration information may at least include information indicating a strength threshold, such that during the UE being under the idle state or the inactive state, the UE performs measurement only on one or more SSBs of the plurality of SSBs which have received signal strength higher than the strength threshold when the UE is under a connected state.

Figure 4:
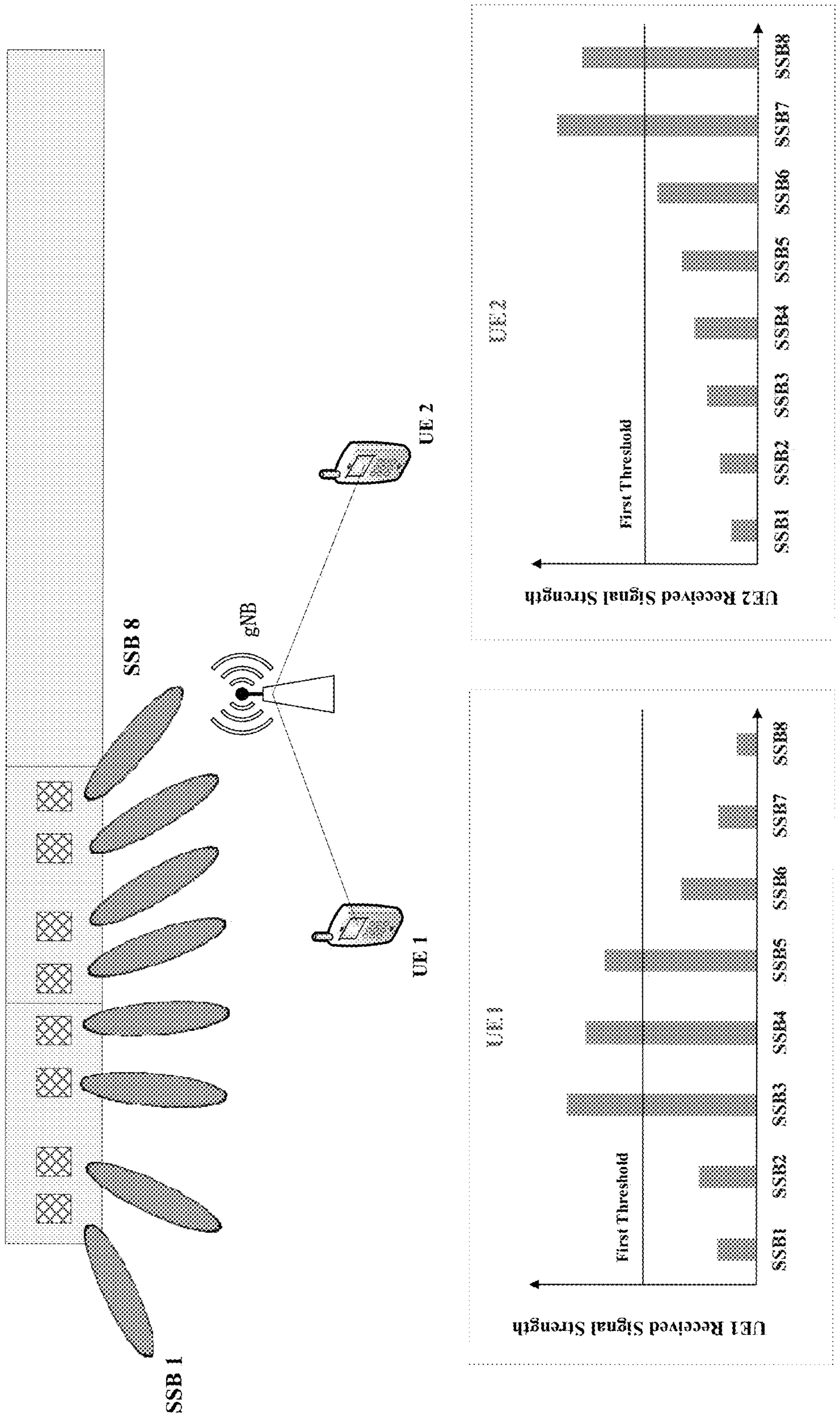
FIG. 4 schematically illustrates an example of performing measurement on SSB selectively according to a first embodiment of the present disclosure.

FIG. 4 schematically illustrates an example of performing measurement on SSB selectively.

As shown in FIG. 4, a plurality of SSBs corresponding to UE1 and UE2 are named SSB1-SSB8. As explained above, these 8 SSBs may correspond to multiple antennas of a base station of a serving cell, and multiple antennas of base station(s) of one or more neighbor cells. UE1 and UE2 are currently in a stationary status, and received signal strength of each SSB measured under the connected state is shown in the lower part of FIG. 4, respectively.

Since both UE1 and UE2 are both in a stationary status, they can be considered to be in a relatively fixed beam coverage area, and thereby, performing measurement on SSBs corresponding to some beams with weak received signal strengths may not be necessary, and may lead to a waste of power. For example, for UE1, when under the connected state, the received signal strength of SSB1, SSB2, SSB6, SSB7 and SSB8 is weak, and it may have little sense to continue to perform measurement on these SSBs under the idle state or the inactive state, e.g. have no help to possible cell selection/reselection. Therefore, the base station may include a strength threshold in the configuration information indicating the SSB measurement configuration of the UE under the idle state or the inactive state, thereby indicating that under the idle state or the inactive state, the UE performs measurement on part of the SSBs selectively, that is, indicating that, during the UE being under the idle state or the inactive state, the UE performs measurement only on one or more SSBs which have received signal strength higher than the strength threshold when the UE is under the connected state. In the example shown in FIG. 4, based on the strength thresholds shown, UE1 may perform measurement only on SSB3, SSB4, and SSB5 during the idle state or the inactive state, while UE2 may perform measurement only on SSB7 and SSB8 during the idle state or the inactive state.

In one implementation, the strength threshold may be the threshold absThreshSS-BlocksConsolidation specified in 3GPP TS 38.331. Of course, the present disclosure is not limited to this threshold. A base station may determine the value of the strength threshold based on various appropriate factors, for example, the base station may determine the strength threshold based on the overall channel quality determined according to transmissions and receptions of various signals. For another example, the base station may also determine the strength threshold based on received signal strength of a historical SSB of the UE. Different strength thresholds can be set for different UEs. A uniform strength threshold may also be set for each UE.

According to the first embodiment, it is also possible to set a mechanism to deal with unexpected events such as displacement or rotation of the UE, and large changes in channel quality.

For example, in addition to the strength threshold, the base station may also include a strength variation threshold in the configuration information indicating the SSB measurement configuration of the UE under the idle state or the inactive state, thereby instructing the UE that, when a variation of received signal strength of any SSB of the one or more SSBs measured during the UE being under the idle state or the inactive state with respect to received signal strength of the SSB measured at a previous time is higher than the strength variation threshold, the UE no longer performs the selective SSB measurement, transitions to perform measurement on all of the plurality of SSBs corresponding to the UE.

In the example shown in FIG. 4, for example, assuming that UE2 is displaced or rotated during the idle state or the inactive state, such that the change of received signal strength of either SSB of SSB7 or SSB8 with respective to received signal strength of the SSB measured at a previous time exceeds the previous strength variation threshold from the base station, UE2 can transition to perform measurement on each SSB in SSB1-SSB8 until the UE2 enters the connected state again and the base station determines it as being under the stationary status. Similar to the strength threshold, the base station may determine the value of the strength variation threshold based on various appropriate factors (such as channel quality, historical fluctuation of received signal strength of SSB, etc.), for example.

It should be noted that setting mechanisms to deal with unexpected events will not have a very large impact on the goal of reducing power consumption. This is because in scenarios (such as a industrial wireless sensor network, video surveillance, and a wearable device and the like) where a UE under a stationary status are applicable, unexpected events, such as UE displacement or rotation, large changes in channel quality, etc. are events with very low probability, and SSB measurements of most of UEs in these scenarios usually would remain stable. Therefore, in the case of applying the solution of the first embodiment of the present disclosure, the overall power consumption can still be effectively reduced.

Next, a conceptual operation flow of a UE will be described with reference to FIG. 5.

The operation of the UE starts at step S500.

At S504, the UE receives configuration information from abase station, the configuration information is transmitted based on the UE being in a stationary status, and the configuration information at least comprises information indicating a strength threshold.

Optionally, the configuration information may also include an strength variation threshold as described above.

At S506, during an idle state or an inactive state, the UE performs SSB measurement based on the received configuration information, especially the strength threshold. Specifically, only one or more SSBs which have received signal strength being higher than the strength threshold when the UE is under a connected state are measured.

Figure 5:
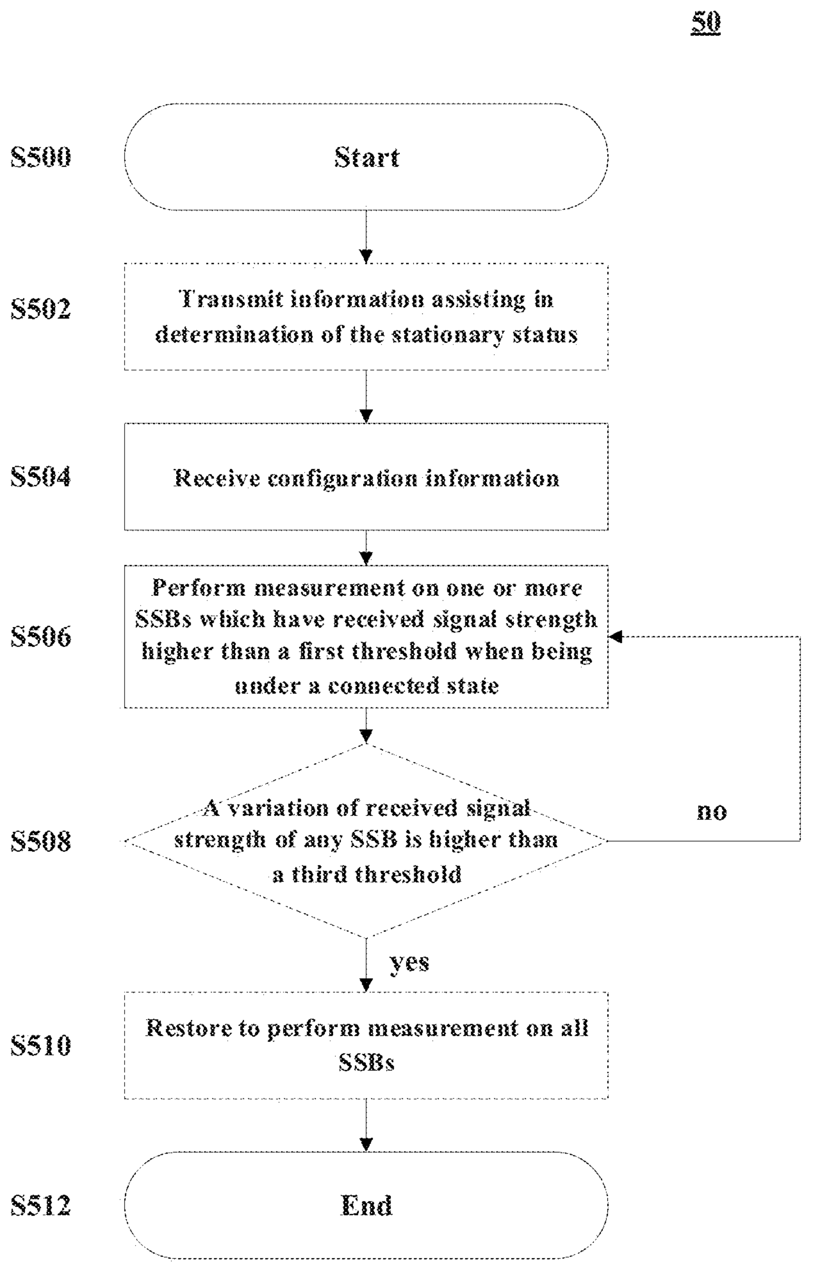
FIG. 5 schematically illustrates a conceptual operation flow of a terminal device side according to a first embodiment of the present disclosure.

In addition to S504 and S506, the UE may also perform some optional operations as shown in FIG. 5 by the dashed boxes.

For example, before receiving the configuration information, at S502, the UE may transmit information assisting in determination of the stationary status to the base station, so as to help the base station determine whether the UE is in a stationary status. As mentioned above, the information assisting in determination of the stationary status may at least include information indicating the type of the UE and/or information related to received signal strength of historical downlink reference signals.

In addition, during performing SSB measurement under the idle state or the inactive state, at S508, the UE can also determine whether a variation of received signal strength of any SSB with respect to received signal strength of the SSB measured at a previous time is higher than a strength variation threshold indicated in the configuration information.

If the variation of the received signal strength of any SSB is higher than the strength variation threshold, at S510, the UE no longer performs selective measurement on a plurality of SSBs, instead, transitions to perform measurement on each SSB of the plurality of SSBs corresponding to the UE. If there is no such cases that the variation of the received signal strength of any SSB is higher than the strength variation threshold, the UE continues to perform the selective measurement on the plurality of SSBs based on the strength threshold, and continuously monitors the variation of received signal strength of each measured SSB.

The conceptual operation flow of the UE ends at S512.

It should be noted that the operation steps of the UE shown in FIG. 5 are only schematic. In practice, the operations of the UE may also include some additional or alternative steps. For example, in the case of combining with the second embodiment described below, the UE may also include operation(s) such as determining SSB measurement timing.

Structure and Operation Flow of a Control Device According to a First Embodiment of the Present Disclosure The exemplary structure and exemplary operations of the terminal device according to the present disclosure have been described in detail above. Next, an exemplary structure and an exemplary operation flow of a control device according to the present disclosure will be described with reference to FIGS. 6-7.

First, a conceptual structure of an electronic device 20 for a control device/base station according to an embodiment of the present disclosure will be described with reference to FIG. 6.

Figure 6:
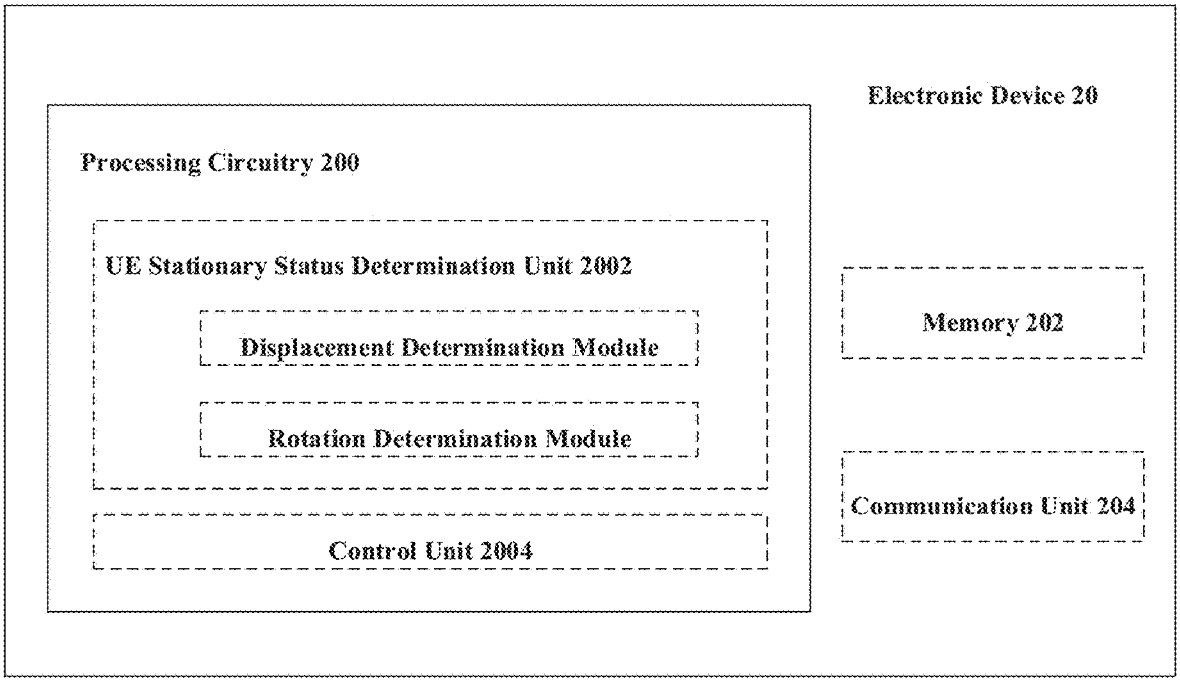
FIG. 6 schematically illustrates a conceptual configuration of an electronic device on a control device side according to a first embodiment of the present disclosure.

As shown in FIG. 6, the electronic device 20 may include a processing circuitry 200. The processing circuitry 200 may be configured to determine whether a UE is in a stationary status; and in response to determining that the UE is in the stationary status, transmit, to the UE, configuration information indicating performing measurement on one or more SSBs of a plurality of SSBs corresponding to the UE when the UE is under an idle state or an inactive state, wherein the configuration information at least comprises information indicating a strength threshold, such that the UE performs measurement, during the UE being under the idle state or the inactive state, only on one or more SSBs of the plurality of SSBs which have received signal strength higher than the first threshold when the UE is under a connected state.

The processing circuitry 200 may be in the form of a general-purpose processor, or a special-purpose processing circuit, such as an ASIC. For example, the processing circuitry 200 can be constructed by a circuit (hardware) or a central processing device (such as, a central processing unit (CPU)). In addition, a program (software) for operating the circuit (hardware) or the central processing device may be carried on the processing circuitry 200. The program can be stored in a memory (such as arranged in a memory 101) or an external storage medium connected from the outside, and downloaded via a network (such as the Internet).

In one implementation, the processing circuitry 200 may comprise a UE stationary status determination unit 2002 for determining whether the UE is in a stationary status. The UE stationary status determination unit 2002 may optionally include a displacement determination module and a rotation determination module. The UE stationary status determination unit 2002 may determine whether the UE is in the stationary status based on, for example, a measurement report of the UE on reference signal(s), and additionally based on information assisting in determination of the stationary status transmitted by the UE. Related operations for determining whether the UE is in a stationary status have been described above with reference to FIG. 3, and will not be repeated here.

The processing circuitry 200 may also include a control unit 2004. The control unit 2004 can, for example, generate configuration information for SSB measurement for the UE in the idle state or the inactive state. For example, as described above, the control unit 2004 may determine the above strength threshold, and additionally, determine the strength variation threshold, and include them in the configuration information. The control unit 2004 may also control, for example, transmitting configuration information to the UE via the communication unit 204, so that the UE can perform appropriate SSB measurement during the idle state or the inactive state.

In addition, optionally, the electronic device 20 may further include a memory 202 and a communication unit 204 shown in dotted lines in the figure. In addition, the electronic device 20 may also include other components not shown, such as a radio frequency link, a baseband processing unit, a network interface, a processor, a controller, and the like. The processing circuitry 200 may be associated with the memory 202 and/or the communication unit 204. For example, the processing circuitry 200 may be directly or indirectly (e.g., other components may be connected therebetween) connected to the memory 202 for data access. For another example, the processing circuitry 200 may be directly or indirectly connected to the communication unit 204 to transmit radio signals via the communication unit 204 and to receive radio signals via the communication unit 204.

The memory 202 can store various information generated by the processing circuitry 200 (for example, measurements of various reference signals (including SSB) received from the UE, information assisting in determination of the stationary status, and strength threshold and strength variation threshold to be included in configuration information, etc.), programs and data for operations of the electronic device 20, data to be transmitted by the communication unit 204, etc. The memory 202 is drawn with dashed lines because it could also be located within the processing circuitry 200 or external to the electronic device 20. The memory 202 may be a volatile memory and/or a non-volatile memory. For example, the memory 202 may include, but is not limited to, a random access memory (RAM), a dynamic random access memory (DRAM), a static random access memory (SRAM), a read only memory (ROM), and a flash memory.

The communication unit 204 may be configured to communicate with a terminal device under the control of the processing circuitry 200. In one example, the communication unit 204 may be implemented as a transmitter or a transceiver, including communication components such as an antenna array and/or a radio frequency link.

Although the processing circuitry 200 is shown as being separate from the communication unit 204 in FIG. 6, the processing circuitry 200 may also be implemented to include the communication unit 204. Furthermore, the processing circuitry 200 may also be implemented to include one or more other components in the electronic device 20, or the processing circuitry 200 may be implemented as the electronic device 20 itself. In actual implementation, the processing circuitry 200 may be implemented as a chip (such as an integrated circuit module comprising a single wafer), a hardware component, or a complete product.

It should be noted that the above units are only logical modules divided according to specific functions they implement, and are not used to limit specific implementations, for example, they can be implemented in software, hardware, or a combination of software and hardware. In practical implementations, each of the above units may be implemented as an independent physical entity, or may also be implemented by a single entity (for example, a processor (CPU or DSP, etc.), integrated circuit, etc.). In addition, each of the above units is shown with dotted lines in the drawings to indicate that these units may not actually exist, and the operations/functions they realized may be realized by the processing circuitry itself.

Next, a conceptual operation flow 70 of a base station will be described with reference to FIG. 7.

The operation of the base station starts at step S700.

At S702, the base station determines whether a UE is in a stationary status. For example, the base station may determine whether the UE is not displaced or rotated within a predetermined time according to a measurement report of reference signals from a serving cell and neighbor cells that the UE transmits to the base station under a connected state. Additionally, in addition to the measurement report, the base station may also determine whether the UE is in a stationary status by using information assisting in determination of the stationary status (for example, information indicating the type of the UE and/or information related to received signal strength of a historical downlink reference signal) transmitted by the UE.

In response to determining that the UE is in the stationary status, at S704, the base station transmits to the UE configuration information indicating performing measurement on one or more SSBs of a plurality of SSBs corresponding to the UE when the UE is under an idle state or an inactive state, wherein the configuration information at least comprises information indicating a strength threshold, such that the UE performs selective SSB measurement during the idle state or the inactive state, that is, performing measurement only on one or more SSBs which have received signal strength higher than the strength threshold when the UE is under the connected state. For example, the base station may transmit the configuration information by means of any suitable signaling (such as RRC Release) indicating that the UE transitions from the connected state to the idle state or the inactive state. Alternatively, the base station may also use other appropriate signaling to transmit the configuration information separately from any appropriate signaling indicating that the UE transitions from the connected state to the idle state or the inactive state.

Optionally, the configuration information transmitted at S704 may also include a strength variation threshold, thereby indicating to the UE that if a variation of received signal strength of any SSB measured during the idle state or the inactive state with respect to received signal strength of the SSB measured at a previous time is higher than the threshold, the UE transitions from performing selective SSB measurement to performing measurement on each SSB of the plurality of SSBs corresponding to the UE.

In response to determining that the UE is not in a stationary status, at S706, the base station transmits to the UE configuration information indicating that the UE performs normal measurement on a plurality of SSBs corresponding to the UE when the UE is under the idle state or the inactive state. Here, the normal measurement means performing measurement on each SSB of the plurality of SSBs corresponding to the UE.

The operation flow of the base station ends at S708.

Figure 7:
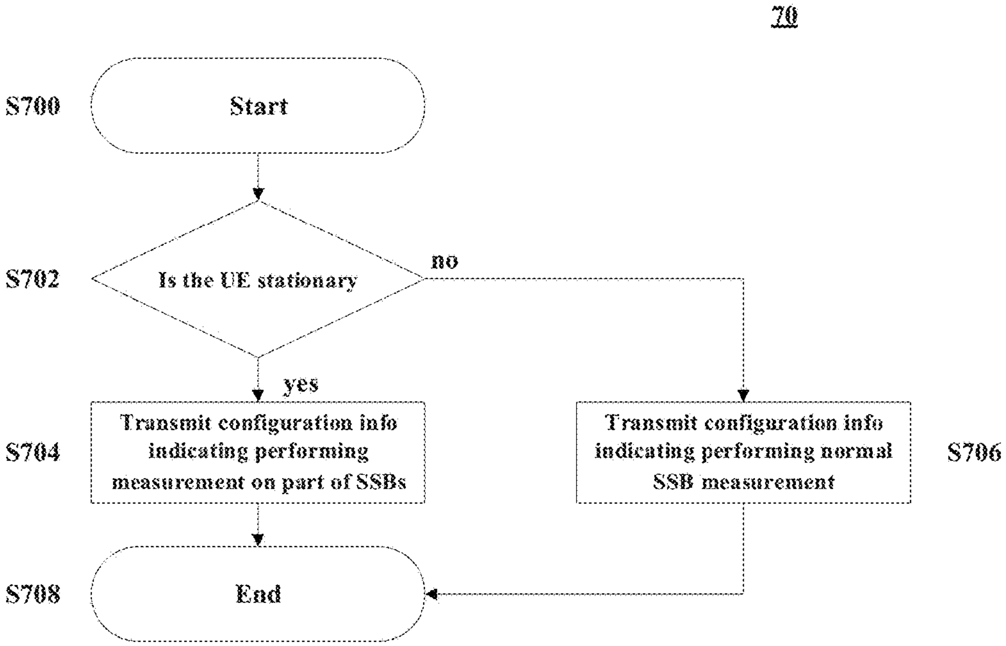
FIG. 7 schematically illustrates the conceptual operation flow of a control device side according to a first embodiment of the present disclosure.
Figure 8:
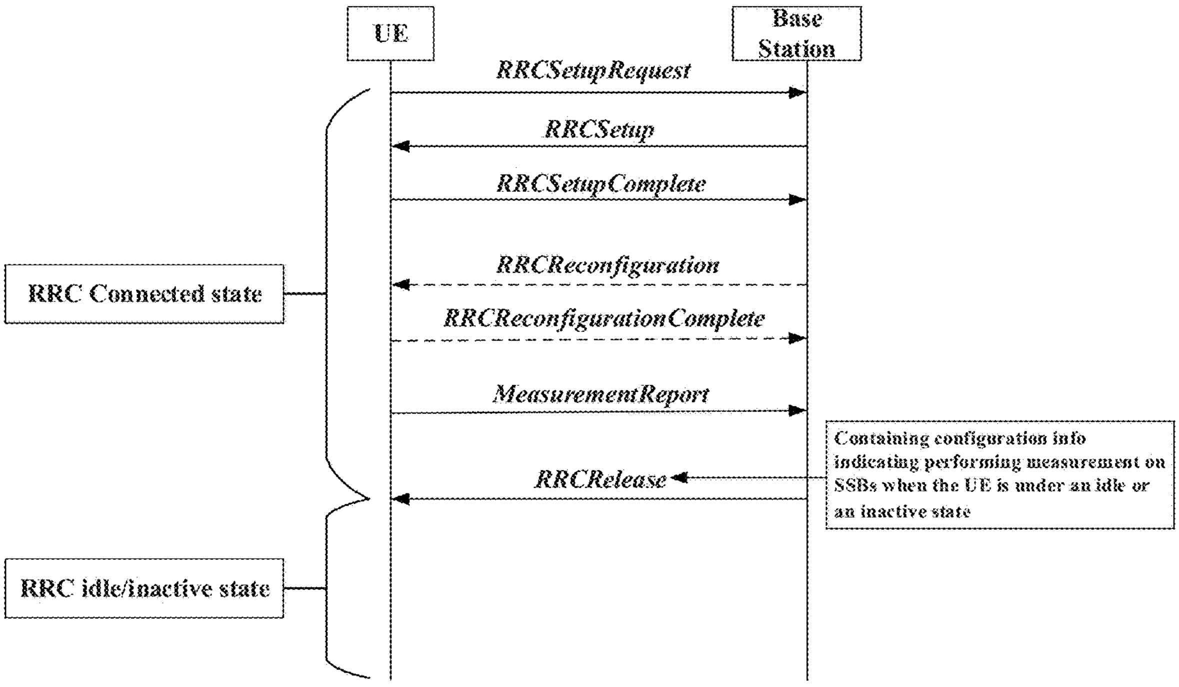
FIG. 8 schematically illustrates an exemplary information interaction according to a first embodiment of the present disclosure.

It should be noted that the operation steps of the base station shown in FIG. 7 are only schematic. In practice, the operations of the base station may also include some additional or alternative steps. For example, in the case of combining with the second embodiment described below, the base station may also include operations such as dividing UEs into groups, and in response to receiving a measurement report of a certain UE within a group, notify other UEs within the group of restoring normal SSB measurement, etc.

Interactions Between Base Station and UE

The schematic configuration and operation flow of a terminal device and a base station according to a first embodiment have been described above with reference to the accompanying drawings. Next, the interaction between a base station and a terminal device according to the first embodiment will be described with reference to FIG. 8.

First, a UE can interact with a base station to enter a RRC connected state. For example, the UE may transmit RRCSetupRequest signaling to the base station to request to enter the connected state. In response to the request, the base station may transmit RRCSetup to the UE to instruct the UE to establish the connected state. Subsequently, the UE may transmit RRCSetupComplete signaling to the base station to report that the UE has entered the connected state. During the connected state, the base station can optionally use RRCReconfiguration signaling to instruct the UE to reconfigure the connected state. In response to this, the UE may optionally transmit RRCReconfigurationComplete signaling to the base station to inform the base station that the RRC reconfiguration has been completed.

During the connected state, the UE can use the MeasurementReport signaling to transmit a measurement report of reference signal (s) (including SSB) to the base station. As described above, the measurement report indicates received signal strength of corresponding SSBs received by the UE from the base station of a serving cell and received signal strength of corresponding SSBs received by the UE from base stations of one or more neighbor cells. The base station can determine whether the UE is stationary by means of the measurement report. In addition, by using the MeasurementReport signaling, the UE may also transmit to the base station information assisting in determination of the stationary status described above. Alternatively, the UE may also transmit the information assisting in determination of the stationary status separately from the MeasurementReport.

When the UE can transition from the connected state to the idle state or the inactive state, the base station can transmit RRCRelease signaling to the UE to instruct the UE to enter the idle state or the inactive state. The RRCRelease signaling may also include information for configuring some operations of the UE during the idle state or the inactive state, for example, configuration information indicating performing measurement on one or more SSBs of the plurality of SSBs corresponding to the UE when the UE is under the idle state or the inactive state as described above.

In response to receiving the RRCRelease signaling, the UE enters the idle state or the inactive state, and can perform SSB measurement according to the configuration information included in the signaling (specifically, for example, strength threshold, strength variation threshold, etc.).

The first embodiment of the present disclosure has been described above in detail with reference to FIGS. 1-8. According to the first embodiment of the present disclosure, advantageously, in the idle state or the inactive state, the UE can reduce the number of SSBs to be measured, thereby reducing power consumption. Further, based on the strength comparison threshold, the UE can also restore to perform measurement on all SSBs involved, so as to avoid its failure to work normally due to unexpected events (such as the UE being moved, a large change in the communication environment, etc.).

Second Embodiment

According to a second embodiment of the present disclosure, a base station can transmit, to a UE under a stationary status, reception of configuration information indicating performing measurement on one or more SSBs corresponding to the UE when the UE is under an idle state or an inactive state. For example, the configuration information may include at least information indicating SSB measurement timing and information indicating a strength variation threshold (which may be the same as or different from the strength variation threshold in the first embodiment), and the SSB measurement timing is within a paging period of every N paging periods, N being an integer greater than 1, thus indicate to the UE to perform the following operations during the UE being under the idle state or the inactive state:

performing measurement on the one or more SSBs according to the SSB measurement timing, and performing measurement on the one or more SSBs in every paging period in response to a variation of received signal strength of any of the measured one or more SSBs with respect to received signal strength measured at a previous time being higher than the strength variation threshold.

The second embodiment will be described in detail below with reference to FIGS. 9-17.

Figure 9:
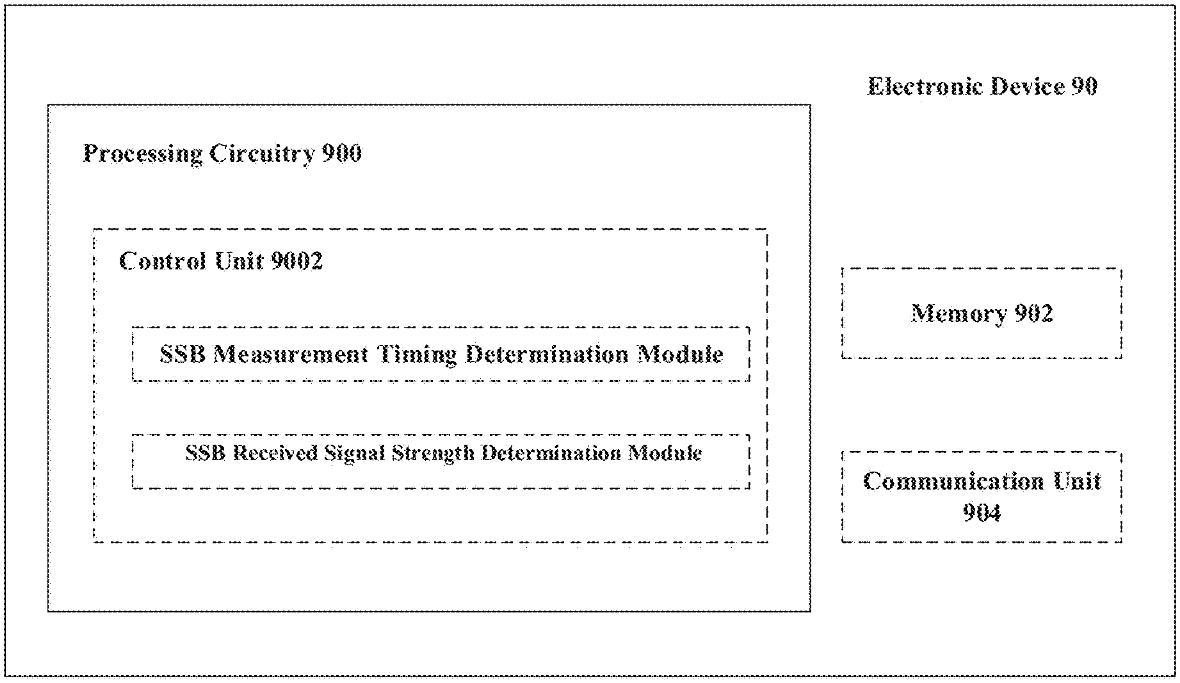
FIG. 9 schematically illustrates a conceptual configuration of a terminal device side according to a second embodiment of the present disclosure.

Structure and Operation Flow of UE According to the Second Embodiment of the Present Disclosure Conceptual structure of an electronic device 90 for a terminal device/user device according to an embodiment of the present disclosure will be described below with reference to FIG. 9.

The overall structure of the electronic device 90 according to the second embodiment is similar to that of the electronic device 10 according to the first embodiment. As shown in FIG. 9, similar to the electronic device 10 according to the first embodiment shown in FIG. 2, the electronic device 90 may include a processing circuitry 900, and optionally include a memory 902 and a communication unit 904. The memory 902 and the communication unit 904 are similar to the memory 102 and the communication unit 104 described with reference to FIG. 2, and will not be repeated here. The implementation of the processing circuitry 900 is similar to that of the processing circuitry 100 described with reference to FIG. 2, that is, it may be in the form of a general-purpose processor or a special-purpose processing circuit, and will not be further described here.

The processing circuitry 900 of the electronic device 90 may be configured to receive, from a base station, configuration information indicating performing measurement on one or more SSBs corresponding to the electronic device 90 when the electronic device 90 is under an idle state or an inactive state, wherein the configuration information is transmitted based on the electronic device 90 being in a stationary status. The configuration information at least comprises information indicating SSB measurement timing and information indicating a strength variation threshold, wherein the SSB measurement timing is within a paging period of every N paging periods, N being an integer greater than 1; and, the processing circuitry 900 is further configured to, during the electronic device 90 being under the idle state or the inactive state, perform measurement on the one or more SSBs according to the SSB measurement timing, and perform measurement on the one or more SSBs in every paging period in response to a variation of received signal strength of any of the measured one or more SSBs with respect to received signal strength measured at a previous time being higher than the strength variation threshold.

In one implementation, the processing circuitry 900 may comprise a control unit 9002 for controlling SSB measurement based on configuration information received from the base station. For example, the control unit 9002 may include an SSB measurement timing determination module configured to determine the SSB measurement timing (for example, based on configuration information received via the communication unit 904), and control the electronic device 90 to perform measurement on one or more SSBs according to the determined SSB measurement timing. In addition, the control unit 1002 can also monitor SSB measurements, so that when the variation of the received signal strength of any SSB is higher than the strength variation threshold, controls to transition from performing SSB measurement according to the SSB measurement timing to performing SSB measurement at every paging period in a normal way. For example, the control unit 1002 may include an SSB received signal strength determination module configured to determine a variation of received signal strength of any SSB with respect to received signal strength measured at a previous time, compare the variation with a strength variation threshold included in configuration information received via the communication unit 904, and when the variation is higher than the strength variation threshold, restore to perform measurement on SSBs in every paging period.

Various operations implemented by the electronic device 10 will be described below with reference to FIGS. 10-11.

As briefly introduced above, a base station can transmit, to a UE, reception of configuration information indicating performing measurement on one or more SSBs corresponding to the UE when the UE is under an idle state or an inactive state, so as to indicate to the UE to performs SSB measurement according to SSB measurement timing included in the configuration information during the idle state or the inactive state. Such configuration information may be transmitted based on the UE being under a stationary status. The specific operations regarding determining whether the UE is under a stationary status have been described above with reference to the first embodiment, and will not be further described here. Further, SSB measurement period determined according to the SSB measurement timing of the present disclosure is longer than conventional SSB measurement period.

As mentioned above, conventionally, in NR, SSB measurement is performed periodically at every paging occasion after a UE entering IDLE/INACTIVE state in case of high S/N ratio. Further as mentioned above, the present disclosure notices that, for a substantially stationary UE, the SSB measurement period can be appropriately extended to reduce power consumption. For example, the SSB measurement may be performed once every multiple paging periods.

In one implementation, a base station may determine SSB measurement timing for each UE in a group of UEs based on the group of UEs. For example, such a group of UEs may include a plurality of UEs that are geographically close and whose beam measurements are close.

Figure 10A:
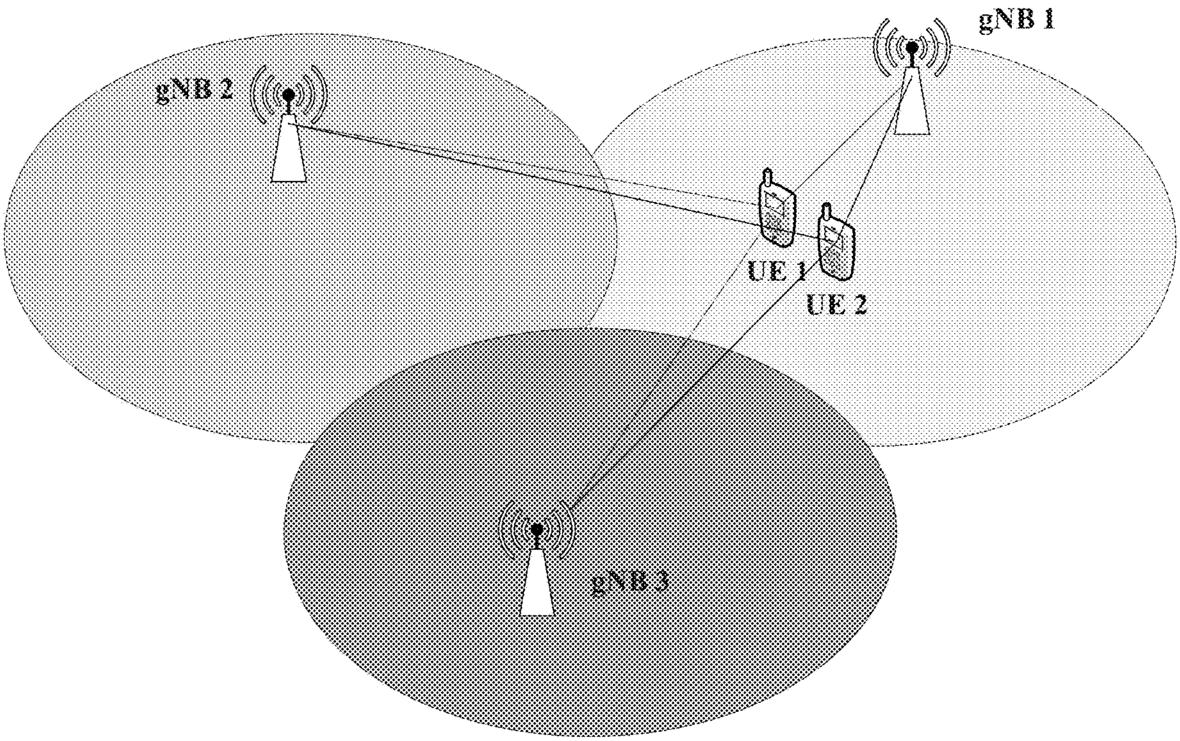
FIG. 10A schematically illustrates a schematic diagram of determining whether geographic locations of terminal devices are close according to an embodiment of the present disclosure.
Figure 10B:
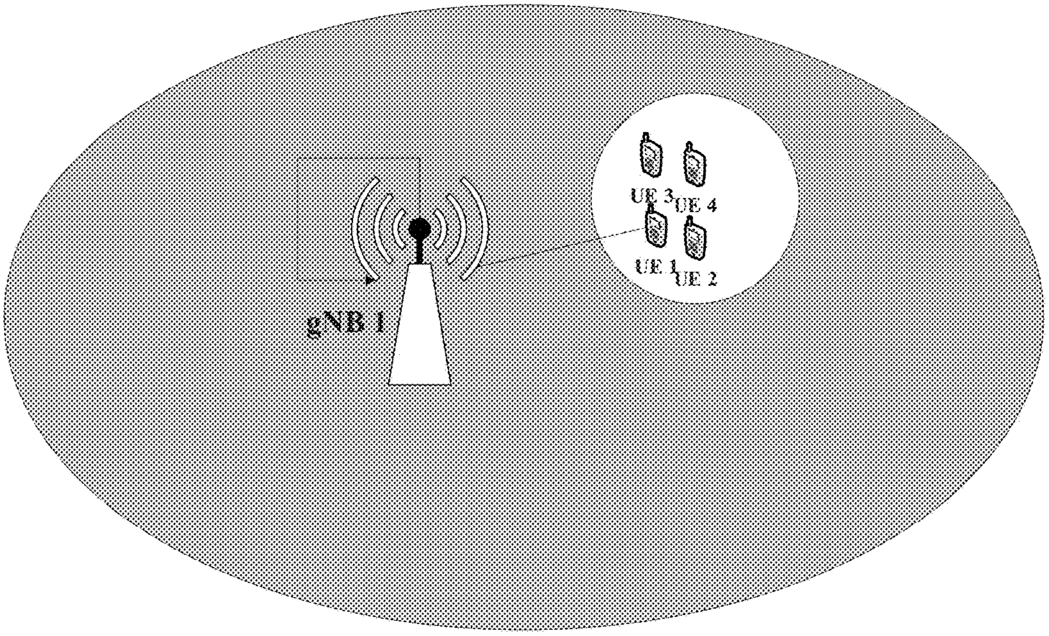
FIG. 10B schematically illustrates a schematic diagram of determining whether beam measurements of terminal devices are close according to an embodiment of the present disclosure.

FIG. 10A and FIG. 10B schematically illustrate schematic diagrams of determining whether geographical locations of a UEs are close and determining whether beam measurements of UEs are close according to the present disclosure, respectively.

As shown in FIG. 10A, according to the present disclosure, the base station of the serving cell can determine any two UEs as geographically close: the difference in received signal strength of corresponding SSBs received by the two UEs from the base station of the serving cell and the difference in received signal strength of corresponding SSBs received from base stations of two neighbor cells are both less than a strength difference threshold. The base station may set any appropriate value for the strength difference threshold depending on situations. As mentioned above, for one UE, there may be a plurality of SSBs, for example, one or more SSBs from the base station of the serving cell and one or more SSBs from each neighbor cell, and in this case, the above "the difference in received signal strength of corresponding SSBs" shall be understood to mean the difference in received signal strength of each corresponding SSB of a plurality of SSBs.

Similar to what has been described above regarding the determination of whether a UE is displaced, considering that there may be a symmetrical relation in position between two UEs (for example, both are on a circumference around the base station of the serving cell, or positions of the two UEs are symmetrical relative to the connection line between the base station of the serving cell and the base station of a neighbor cell), in order to improve the accuracy of determination, the present disclosure determines whether the two UEs are geographically close using the difference in received signal strengths of corresponding SSBs received by two UEs from the base station of the serving cell and the difference in received signal strengths of corresponding SSBs received from base stations of two neighbor cells.

As shown in FIG. 10B, according to the present disclosure, the base station of the serving cell can determine any of the following two UEs as having close beam measurements: a magnitude relation among received signal strength of corresponding SSBs received by the two UEs from the base station of the serving cell and a magnitude relation among received signal strength of corresponding SSBs received from a base station of a neighbor cell are all consistent. The "magnitude relation among received signal strength" has already been described in the first embodiment, and will not be repeated here.

After determining the groups of UEs that are geographically close and beam measurements thereof are close, the SSB measurement timing can be easily determined for each UE in each group of UEs. For example, for a group of UEs including N (N is an integer greater than 1) UEs, each UE in the group may perform SSB measurement within a paging period of every N paging periods. Specifically, a first UE in the group may perform SSB measurement within the first paging period of every N paging periods, a second UE in the group may perform SSB measurement within the second paging period of every N paging periods, and a third UE in the group may perform SSB measurement within the third paging period of every N paging periods, and so on, and when one UE is performing measurement, other UEs in the group do not perform SSB measurement. In other words, according to the second embodiment, the SSB measurement timing is determined to be within a paging period of every N paging periods, N being an integer greater than 1. Here, there is no specific limitation on the specific value of N, and the base station may determine the magnitude of N (for example, determine how many UEs may be included in the same group) depending on situations.

Figure 11:
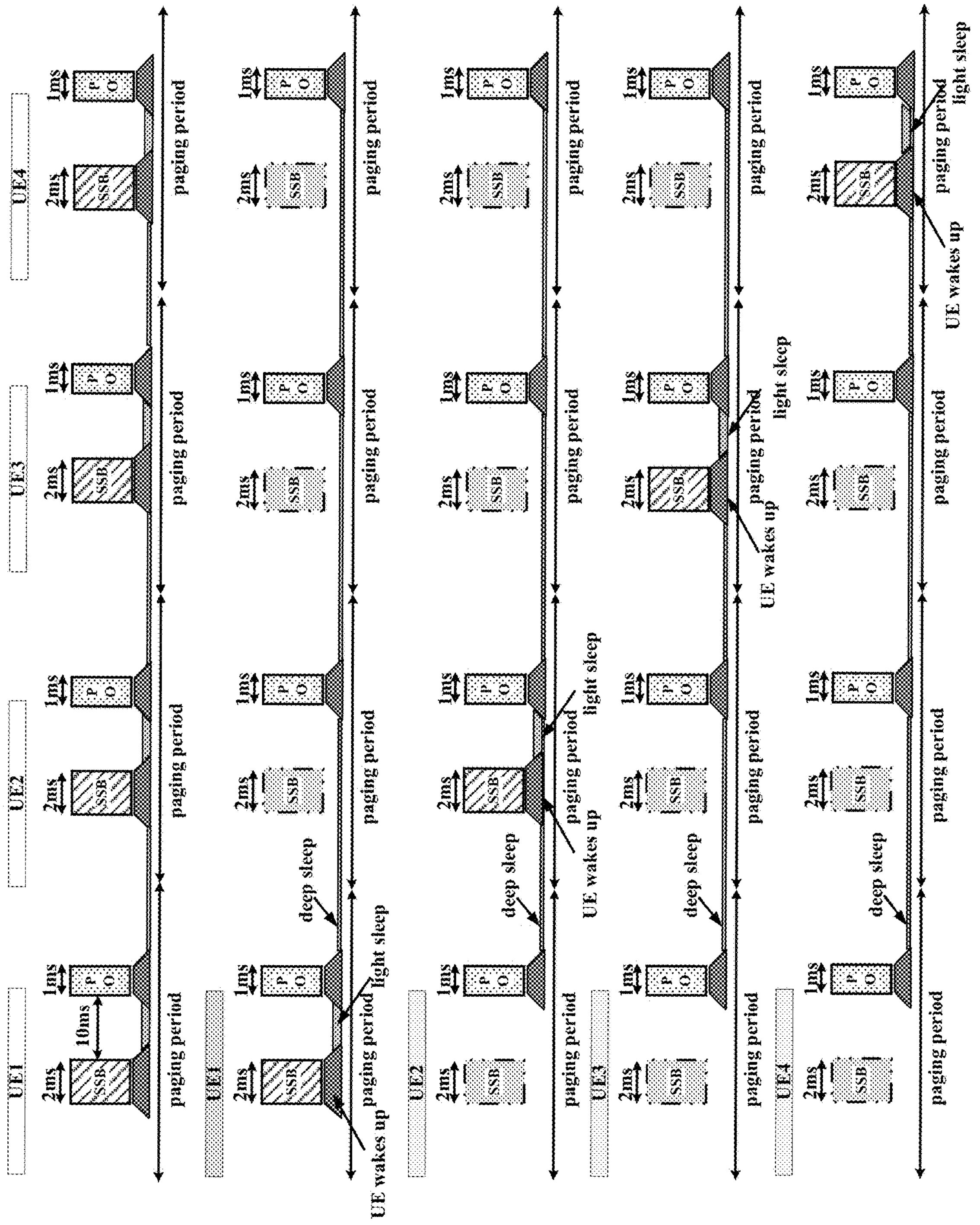
FIG. 11 schematically illustrates a schematic diagram of SSB measurement timing according to a second embodiment of the present disclosure.

FIG. 11 schematically illustrates a schematic diagram of SSB measurement timing according to a second embodiment of the present disclosure.

An example of determining SSB measurement timing based on a group of UEs including 4 UEs is shown in FIG. 11. The first row in FIG. 11 shows the overall SSB measurement timing arrangement of the group of UEs, the second row shows the SSB measurement timing of UE1, the third row shows the SSB measurement timing of UE2, the fourth row shows the SSB measurement timing of UE3, and the fifth row shows the SSB measurement timing of UE4.

As shown in FIG. 11, for each UE in the group, the SSB measurement timing is determined to be within a paging period of every 4 paging periods. Specifically, UE1 can perform SSB measurement within the first paging period of every 4 paging periods, while other UEs do not perform SSB measurement when UE1 is performing SSB measurement; UE2 can perform SSB measurement within the second paging period of every 4 paging periods, while other UEs do not perform SSB measurement when UE2 is performing SSB measurement; UE3 can perform SSB measurement within the third paging period of every 4 paging periods, while other UEs do not perform SSB measurement when UE3 is performing SSB measurement; and UE 4 can perform SSB measurement within the fourth paging period of every 4 paging periods, while other UEs do not perform SSB measurement when UE4 is performing SSB measurement.

As shown in FIG. 11, taking UE1 as an example, during the idle state or the inactive state, the UE can wake up at each SSB measurement timing and each paging occasion, and is under light sleep during the period between the SSB measurement timing and successive paging occasion, and is under deep sleep during other periods. According to the second embodiment of the present disclosure, since the SSB measurement period is extended, the time for the UE to be in deep sleep is extended, thereby it may be advantageously reducing power consumption.

The specific implementation of determining the SSB measurement timing based on a plurality of UEs with close geographical locations and beam measurements has been described in detail above with reference to FIG. 10 and FIG. 11. However, the present disclosure is not limited to this kind of determining method for SSB measurement timing. A base station may determine the SSB measurement timing by using any applicable manner, as long as the SSB measurement timing is determined such that the SSB measurement period is longer than the paging period. For example, the base station can individually specify for each UE in which paging period of every N (N is an integer greater than 1) paging periods should the SSB measurement be performed, without grouping UEs and determining the value of N based on grouping result.

Similar to the first embodiment, in the second embodiment of the present disclosure, a mechanism for dealing with unexpected events such as displacement or rotation of the UE or a large change in channel quality may also be set.

For example, the base station may include a strength variation threshold in the configuration information indicating the SSB measurement configuration of the UE under the idle state or the inactive state, thereby indicating that, when a variation of received signal strength of any SSB of the one or more SSBs measured during the UE being under the idle state or the inactive state with respect to received signal strength of the SSB measured at a previous time is higher than the strength variation threshold, the SSB measurement is no longer performed according to the SSB measurement timing specified in the configuration information, instead, transitioning to perform SSB measurement on every paging period.

In the example shown in FIG. 11, for example, assuming that UE2 is displaced or rotated during the idle state or the inactive state, such that the change of received signal strength of any SSB corresponding to it with respect to previous received signal strength of the SSB exceeds the strength variation threshold, UE2 can transition to perform SSB measurement in every paging period, until the UE2 enters the connected state again and the base station determines it as under the stationary status again. The strength variation threshold according to the second embodiment may be the same as or different from the strength variation threshold according to the second embodiment, and the base station may determine the value of the strength variation threshold according to the second embodiment based on various appropriate factors (such as channel quality, historical fluctuation of received signal strength of SSB, etc.), for example.

Next, a conceptual operation flow of a UE according to the second embodiment will be described with reference to FIG. 12.

The operation of the UE starts at step S1200.

At S1204, the UE receives configuration information from a base station, the configuration information is transmitted based on the electronic device being in a stationary status, and the configuration information may at least include information indicating SSB measurement timing and information indicating a strength variation threshold.

At S1206, during an idle state or an inactive state, the UE performs SSB measurement according to the SSB measurement timing based on the received configuration information.

In addition, during performing SSB measurement under the idle state or the inactive state, at S1208, the UE may determine whether a variation of received signal strength of any SSB with respect to received signal strength of the SSB measured at a previous time is higher than the strength variation threshold indicated in the configuration information.

If the variation of the received signal strength of any SSB is higher than the strength variation threshold, at S1210, the UE no longer performs SSB measurement according to the SSB measurement timing indicated in the configuration information, instead, performs SSB measurement in every paging period. If there is no such a case that the variation of the received signal strength of any SSB is higher than the strength variation threshold, the UE continues to perform SSB measurement according to the SSB measurement timing indicated in the configuration information, and continuously monitors the variation of received signal strength of each measured SSB.

Figure 12:
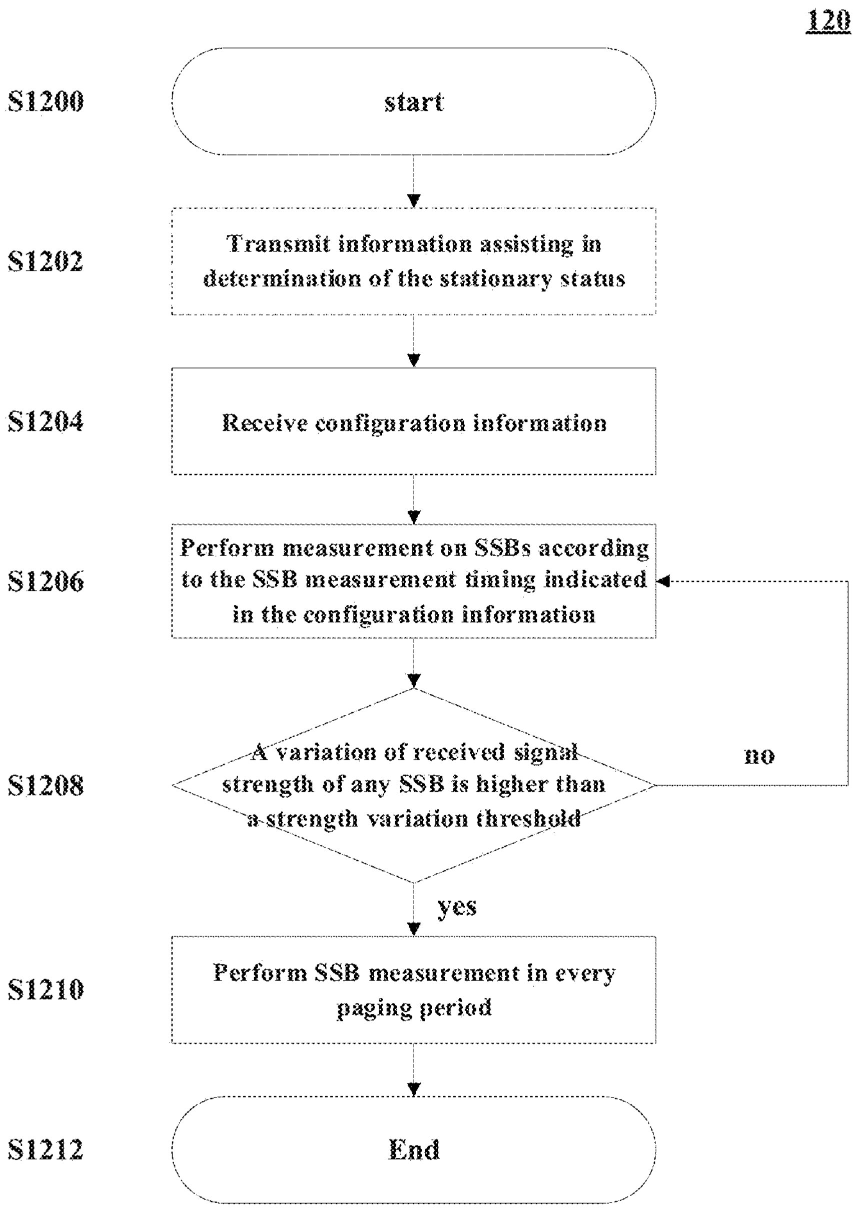
FIG. 12 schematically illustrates a conceptual operation flow of an electronic device on a terminal device side according to a second embodiment of the present disclosure.

In addition, the UE can also perform some optional operations as shown by the dashed boxes in FIG. 12.

For example, similar to the first embodiment, before receiving the configuration information, at S1202, the UE may transmit information assisting in determination of the stationary status to the base station, so as to help the base station determine whether the UE is in the stationary status. As mentioned above, the information assisting in determination of the stationary status may at least include information indicating the type of the UE and/or information related to received signal strength of historical downlink reference signals.

The conceptual operation flow of the UE ends at S1212.

It should be noted that the operation steps of the UE shown in FIG. 12 are only schematic. In practice, the operations of the UE may also include some additional or alternative steps. For example, the second embodiment can also be implemented in combination with the first embodiment described above. In this case, the configuration information may include information indicating the strength threshold in addition to the SSB measurement timing and the strength variation threshold. Accordingly, the UE may further include a step of determining on which SSB(s) to perform measurement.

Structure and Operation Flow of a Control Device According to a Second Embodiment of the Present Disclosure The exemplary structure and exemplary operations of the terminal device according to the second embodiment of the present disclosure have been described in detail above. Next, an exemplary structure and an exemplary operation flow of a control device according to the present disclosure will be described with reference to FIGS. 13-14.

Figure 13:
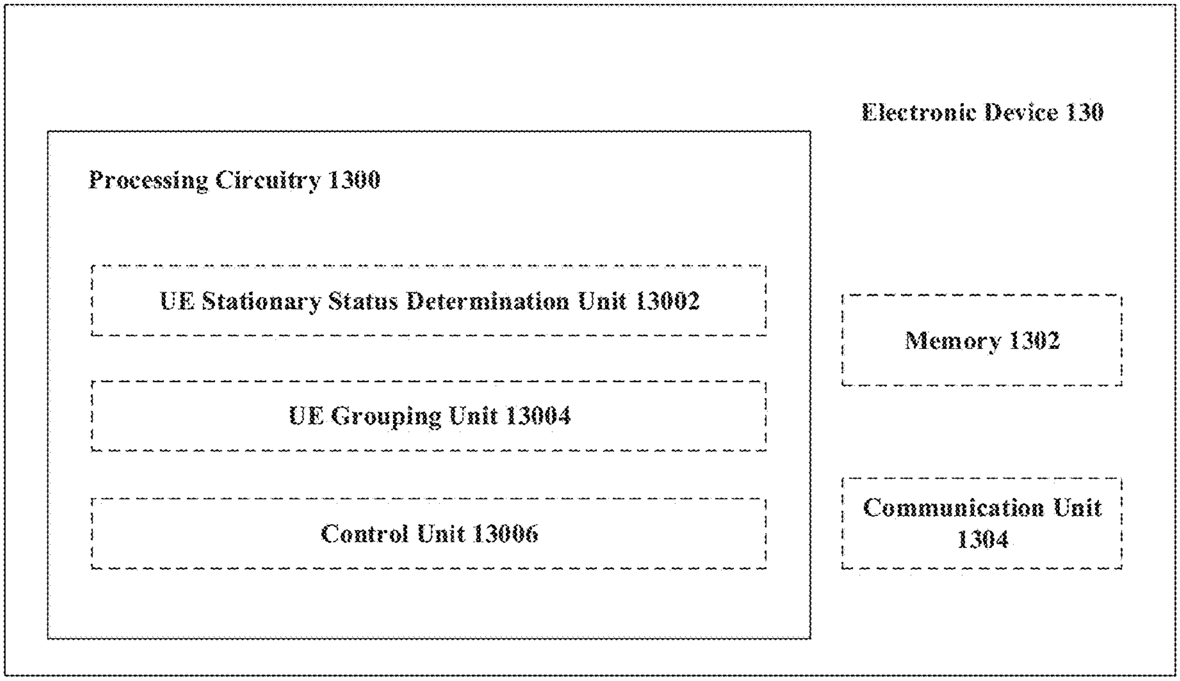
FIG. 13 schematically illustrates a conceptual configuration of an electronic device on a control device side according to a second embodiment of the present disclosure.

First, a conceptual structure of an electronic device 130 for a control device/base station according to an embodiment of the present disclosure will be described with reference to FIG. 13.

The overall structure of the electronic device 130 according to the second embodiment is similar to that of the electronic device 20 according to the first embodiment. As shown in FIG. 13, similar to the electronic device 20 according to the first embodiment shown in FIG. 6, the electronic device 130 may include a processing circuitry 1300 and optionally, include a memory 1302 and a communication unit 1304. The memory 1302 and the communication unit 1304 are similar to the memory 202 and the communication unit 204 described with reference to FIG. 6, and will not be repeated here. The implementation of the processing circuitry 1300 is similar to that of the processing circuitry 200 described with reference to FIG. 6, that is, it may be in the form of a general-purpose processor or a special-purpose processing circuit, and will not be further described here.

The processing circuitry 1300 of the electronic device 130 may be configured to determine whether the UE is in a stationary status; and in response to determining that the UE is in a stationary status, transmit, to the UE, configuration information indicating performing measurement on one or more SSBs corresponding to the UE when the UE is under an idle state or an inactive state, wherein the configuration information at least comprises information indicating SSB measurement timing and information indicating a strength variation threshold, and the SSB measurement timing is within a paging period of every N paging periods, N being an integer greater than 1, causing the UE, during the UE being under the idle state or the inactive state: to perform measurement on the one or more SSBs according to the SSB measurement timing, and to perform measurement on the one or more SSBs in every paging period in response to a variation of received signal strength of any SSB of the measured one or more SSBs with respect to received signal strength of the SSB measured at a previous time being higher than a first threshold.

In one implementation, the processing circuitry 1300 may include a UE stationary status determination unit 13002 for determining whether the UE is in a stationary status. The UE stationary status determination unit 13002 may optionally include a displacement determination module and a rotation determination module (not shown). The UE stationary status determination unit 13002 may determine whether the UE is in the stationary status based on, for example, measurement report of the UE on reference signals, and additionally based on information assisting in determination of the stationary status transmitted by the UE. Related operations for determining whether the UE is in a stationary status have been described above with reference to FIG. 3, and will not be repeated here.

The processing circuitry 1300 may also include a UE grouping unit 13004. The UE grouping unit 13004 may be configured to group a plurality of terminal devices with close geographic locations and close beam measurements into a group of terminal devices. The specific operations of determining whether UEs are geographically close and beam measurements are close have been described above with reference to FIGS. 10A and 10B, and will not be repeated here.

The processing circuitry 1300 may also include a control unit 13006. The control unit 13006 can, for example, generate configuration information for SSB measurement of the UE in the idle state or the inactive state. For example, as described above, the control unit 13006 may determine the SSB measurement timing, e.g., based on the grouping result, and include it in the configuration information. For example, the control unit 13006 may indicate in the configuration information that the UE should perform SSB measurement in a certain paging period of every N paging periods. In addition, the control unit 13004 may also determine the aforementioned strength variation threshold and include it in the configuration information. The control unit 13004 may also control, for example, transmitting configuration information to the UE via the communication unit 1304, causing the UE to perform appropriate SSB measurement during the idle state or the inactive state.

It should be noted that the division of various modules in the processing circuitry is not necessary, and this kind of division of modules is not necessarily fixed. For example, as described above, the base station may determine the SSB measurement timing in any applicable manner without grouping UEs, as long as the SSB measurement timing is determined such that the SSB measurement period is longer than the paging period. In this case, the processing circuitry 1300 may not include the UE grouping unit 13004, and may for example determine for each UE its SSB measurement timing directly by the control unit 13006.

Next, a conceptual operation flow 140 of a base station according to the second embodiment will be described with reference to FIG. 14.

The operation of the base station starts at step S1400.

At 51402, the base station determines whether a UE is in a stationary status. Similar to the first embodiment, for example, the base station may determine whether the UE is not displaced or rotated within a predetermined time according to a measurement report of reference signals from the serving cell and neighbor cells that the UE transmits to the base station under a connected state. Additionally, in addition to the measurement report, the base station may also determine whether the UE is in a stationary status by using information assisting in determination of the stationary status (for example, information indicating the type of the UE and/or information related to received signal strength of historical downlink reference signal(s)) transmitted by the UE.

In response to determining that the UE is in the stationary status, at S1404, the base station transmits to the UE configuration information indicating performing measurement on one or more SSBs corresponding to the UE when the UE is under an idle state or an inactive state, wherein the configuration information at least comprises information indicating SSB measurement timing and information indicating a strength variation threshold, causing the UE to perform SSB measurement at a period longer than the paging period (for example, performs SSB measurement within a paging period of every N paging periods) during the idle state or the inactive state and enabling the UE to transition to perform SSB measurement in every paging period when the variation of received signal strength of any SSB is higher than the strength variation threshold. Similar to the first embodiment, for example, the base station may transmit the configuration information by means of any appropriate signaling (for example, RRC Release) indicating that the UE transitions from the connected state to the idle state or the inactive state. Alternatively, the base station may also use other appropriate signaling to transmit the configuration information separately from any appropriate signaling indicating to the UE to transition from the connected state to the idle state or the inactive state.

In response to determining that the UE is not in a stationary status, at S1406, the base station transmits to the UE configuration information indicating performing regular measurement on one or more SSBs corresponding to the UE when the UE is under the idle state or the inactive state. Here, Regular measurement means that SSB measurement is performed in every paging period.

The operation flow of the base station ends at S1408.

Figure 14:
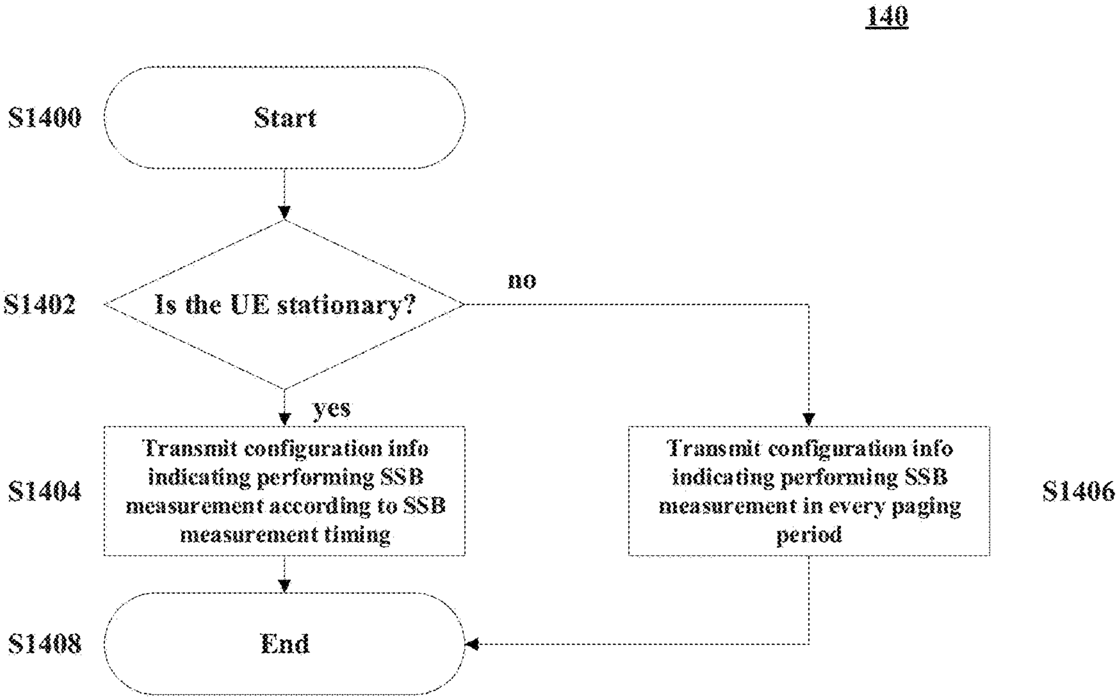
FIG. 14 schematically illustrates a conceptual operation flow of a control device side according to a second embodiment of the present disclosure.

It should be noted that the operation steps of the base station shown in FIG. 14 are only schematic. In practice, the operations of the base station may also include some additional or alternative steps. For example, before transmitting configuration information regarding SSB measurement, the operation flow of the base station may also include steps of grouping UEs based on similarity of geographic locations and beam measurements, and determining SSB measurement timing of each UE in each group according to the grouping result. In addition, when implemented in combination with the first embodiment, the base station may also determine the strength threshold and include it in the configuration information, so that the UE can perform selective SSB measurement during the idle state or the inactive state.

The schematic configuration and operation flow of a terminal device and a base station according to the second embodiment have been described above with reference to the accompanying drawings. The interaction between the UE and the base station according to the second embodiment is similar to the interaction in the first embodiment described with reference to FIG. 8, and will not be repeated here.

The second embodiment of the present disclosure has been described above in detail with reference to FIGS. 9-14. According to the second embodiment of the present disclosure, advantageously, in the idle state or the inactive state, the UE can extend the SSB measurement period, thereby reducing power consumption. Further, based on the strength comparison threshold, the UE can also restore to perform SSB measurement in every paging period, so as to cope with unexpected events (such as the UE being moved, a large change in the communication environment, etc.).

First Variant of the Second Embodiment

It has been described above that a plurality of UEs with close geographic locations and close beam measurements can be grouped into the same group, and the SSB measurement timing of each UE in the group is determined based on the grouping. In this manner, since geographic locations and beam measurements of the UEs in the same group are close, the SSB measurements of any UE may reflect the environment in which the group of UEs are located to some extent. For example, assuming that a variation of SSB measurements of a certain UE in a group with respect to a previous measurement is higher than a strength variation threshold, this most probably means that the environment in which the UE is located has changed, for example, the quality of a channel in some direction(s) has changed greatly, and this environment change is most likely to affect all of a group of UEs to which the UE belongs.

Considering the above characteristics of SSB measurements within the same group of UEs, in the first variant of the second embodiment of the present disclosure, in response to a variation of received signal strength of any SSB of one or more SSBs measured by the UE with respect to received signal strength measured at a previous time being higher than a strength variation threshold, the UE may transition from the idle state or the inactive state to the connected state and transmit SSB measurements (for example, measurements on the one or more SSBs) to the base station. When the base station determines based on the received measurements that the variation of received signal strength of any SSB associated with the UE with respect to received signal strength of the corresponding SSB before entering the idle state or the inactive state is higher than the strength variation threshold, notify one or more UEs under an idle state or an inactive state (for example, other UE(s) in the same group as the UE) that are geographically close and whose beam measurements are close to the UE to stop measurement based on the SSB measurement timing notified in the configuration information, instead, to perform SSB measurement in every paging period.

In the first variation of the second embodiment of the present disclosure, it is also considered that an unexpected event that causes the change in SSB measurements may be transient. For example, The communication environment undergoes a transient change, and then the quality of each channel become stable. For another example, a certain group of UEs collectively moves. For example, in an industrial wireless sensor use case, some sensors with similar locations are moved to another location as a whole. Since the transient unexpected event has passed, SSB measurements may return to become stable. Therefore, in order to further save energy, in the case that the UE performs measurement on one or more SSBs corresponding thereto in every paging period, in response to for a predetermined number of consecutive times of measurement, variations of received signal strength of each SSB of the one or more SSBs with respect to received signal strength measured at a previous time are all less than or equal to a first threshold, the UE may no longer perform SSB measurement in every paging period, instead, restore to perform SSB measurement according to the above SSB measurement timing.

Figure 15:
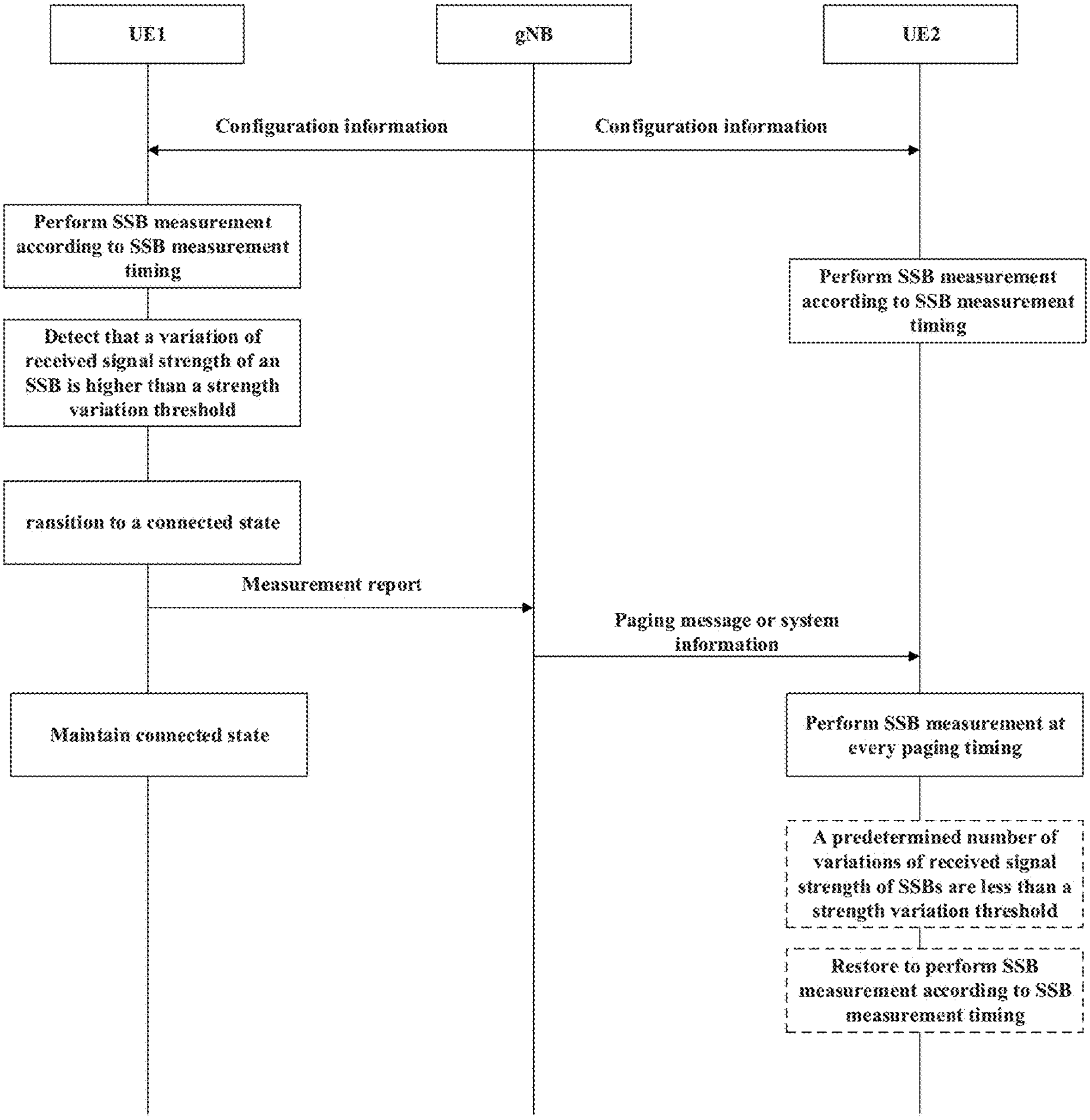
FIG. 15 schematically illustrates an exemplary information interaction according to a first variant of a second embodiment of the present disclosure.

FIG. 15 illustrates interactive operations between a base station and a UE in the first variant of the second embodiment.

In FIG. 15, UE1 and UE2 may be two UEs with close geographic locations and close beam measurements. As shown in FIG. 15, when UE1 and UE2 may change from a connected state to an idle state or an inactive state, the base station may transmit the above configuration information related to SSB measurement in the idle state or the inactive state to UE1 and UE2. For example, as described above, the configuration information may include information indicating SSB measurement timing and information indicating a strength variation threshold.

In response to receiving the configuration information, UE1 and UE2 may perform measurement on one or more SSBs according to the SSB measurement timing after entering the idle state or the inactive state. For example, the SSB measurement is performed in an indicated paging period in every N (N is an integer greater than 1) paging periods.

While performing the SSB measurement, UE1 and UE2 may each monitor changes in received signal strengths of measured SSBs. In the example shown in FIG. 15, UE1 detects that the variation of received signal strength of an SSB is higher than the strength variation threshold. In response to this, UE1 stops performing SSB measurement according to SSB measurement timing, and transitions to perform SSB measurement in every paging period. At the same time or later (e.g., after performing another SSB measurement in order to avoid occasional fluctuations in SSB measurements), UE1 interacts with the base station to switch back to the connected state. Subsequently, UE1 transmits measurements of the one or more SSBs corresponding thereto to the base station.

Based on the received measurements, the base station determines whether the variation of received signal strength of any SSB of the one or more SSBs with respect to received signal strength of corresponding SSB before UE1 entering the idle state or the inactive state is higher than the above strength variation threshold. When the base station determines that the variation is higher than the strength variation threshold, it notifies UE2 so that UE2 performs measurement on the one or more SSBs corresponding thereto in every paging period. For example, the base station may notify UE2 of performing normal SSB measurement by using a paging message or system information (for example, a System Information Block), or using a specific TRS (Tracking Reference Signal)/CSI-RS sequence.

In the example shown in FIG. 15, only UE2 is shown as a UE that is geographically close to UE1 and has close beam measurements. Actually, there may be a plurality of UEs that are geographically close to UE1 and have close beam measurements. In this case, in response to determining that the variation of received signal strength of the SSB (s) of UE1 is higher than the strength variation threshold, the base station will transmit a paging message or system information or a specific TRS/CSI-RS sequence to the plurality of UEs, to notify these UEs of performing normal SSB measurement.

Subsequently, optionally, during the UE2 performing measurement on the one or more SSBs corresponding thereto in every paging period, it may further monitor the change of received signal strength of the SSB(s). In response to for a predetermined number (e.g., 2 or other suitable number) of consecutive times of measurement, variations of received signal strength of each SSB of the one or more SSBs corresponding to UE2 with respect to received signal strength measured at a previous time are all less than or equal to the strength variation threshold indicated in the configuration information, UE2 may no longer perform SSB measurement in every paging period, instead, restore to perform SSB measurement according to the SSB measurement timing indicated in the configuration information.

The first variant of the second embodiment of the present disclosure has been described in detail above with reference to FIG. 15. According to the first variant of the second embodiment, advantageously, unexpected events can be dealt with in time by means of correlation of SSB measurements among a plurality of UEs with close geographical locations and close beam measurements, thereby reducing the impact of the unexpected events on these UEs.

Second Variant of the Second Embodiment

In the first variant of the above second embodiment, UE(s) that do not detect any SSB received signal strength change exceeding the strength variation threshold transitions to normal SSB measurement (i.e., performing SSB measurement in every paging period) based on the trigger of a UE that detects an SSB received signal strength change exceeding the strength variation threshold.

The second variant of the second embodiment proposes another mechanism for transitioning to regular SSB measurement. Next, description will be made in conjunction with FIG. 16 and FIG. 17.

As mentioned above, the configuration information transmitted from the base station includes SSB measurement timing information and the strength variation threshold, and the SSB measurement timing is determined to be within a paging period in every N (N is an integer greater than 1) paging periods. In the second variant, the configuration information transmitted from the base station further includes information indicating a predetermined period T, the predetermined period T including M paging periods, where M is an integer multiple of N. The UE according to the second variant, during performing measurement on one or more SSBs corresponding to the UE according to the SSB measurement timing, every time the predetermined period T passes, transitions from performing measurement on the one or more SSBs according to the SSB measurement timing to performing measurement on the one or more SSBs in every paging period. Further, in the case that the UE according to the second variant performs measurement on one or more SSBs corresponding thereto in every paging period, in response to for a predetermined number of continuous measurements (for example, 2 times or other suitable times), variations of received signal strength of each SSB of the one or more SSBs with respect to received signal strength measured at a previous time are all less than or equal to the strength variation threshold, it is restored to perform measurement on the one or more SSBs according to the SSB measurement timing.

Figure 16:
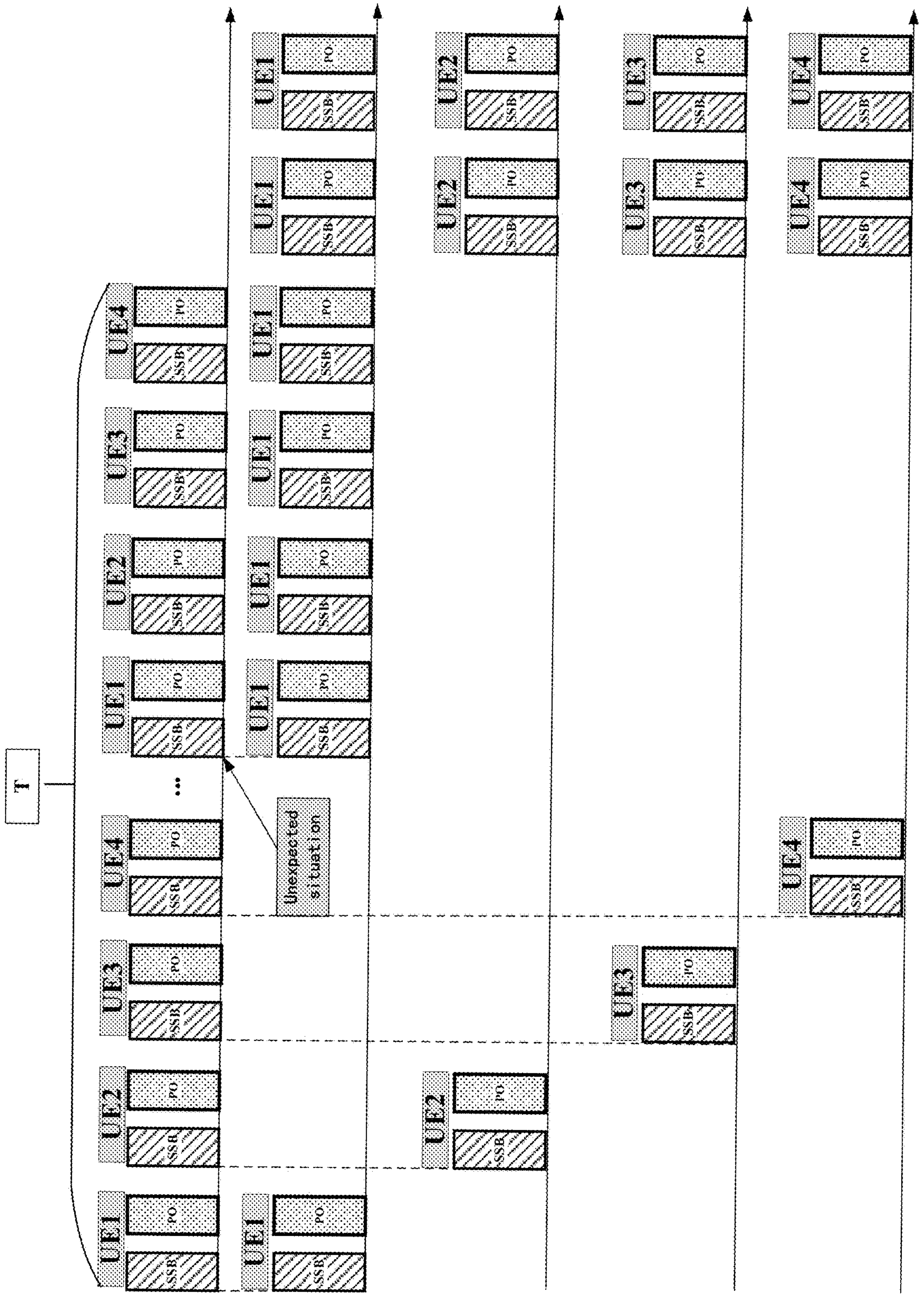
FIG. 16 schematically illustrates a schematic diagram of SSB measurement timing according to a second variant of a second embodiment of the present disclosure.

FIG. 16 schematically illustrates a schematic diagram of SSB measurement timing according to a second variant of a second embodiment of the present disclosure. As shown in FIG. 16, T is the predetermined period included in the above configuration information. During the predetermined period T, assuming that UE1 detects that the variation of received signal strength of an SSB is higher than the strength variation threshold, then UE1 transitions from performing a SSB measurement every N paging periods to performing SSB measurement in every paging period, while other UEs (such as UE 2-UE4) still perform SSB measurement according to the specified SSB measurement timing. After one predetermined period T, all UEs, regardless of whether the UE has detected that the variation of received signal strength of an SSB during the predetermined period T is higher than the strength variation threshold, transition to perform SSB measurement in every paging period.

In the second variant, in order to further save energy, similar to the first variant, in the case that the UE performs measurement on one or more SSBs corresponding thereto in every paging period (regardless of whether the UE has detected that the variation of received signal strength of the SSB is higher than the strength variation threshold during last predetermined period T), in response to for a predetermined number of consecutive measurements, the measured variations of received signal strength of each SSB of the one or more SSBs corresponding to the UE with respect to received signal strength measured at a previous time are all less than or equal to the strength variation threshold, the UE may restore to perform SSB measurement according to the above SSB measurement timing.

It should be noted that, according to the second variant of the second embodiment, UE1-UE4 in FIG. 16 may be UEs that are grouped together by the base station due to close geographic locations and close beam measurements similar to the first variant. However, according to the second variant of the second embodiment, UE1-UE4 in FIG. 16 are not necessarily UEs with close geographic locations and close beam measurements. The SSB measurement timing of UE1-UE4 in FIG. 16 are also only exemplary and non-limiting, as long as the UE can restore to regular SSB measurement according to the solution disclosed in the second variant (e.g., in response to the variation of received signal strength of an SSB being higher than the strength variation threshold, or in response to elapse of a predetermined period T).

Figure 17:
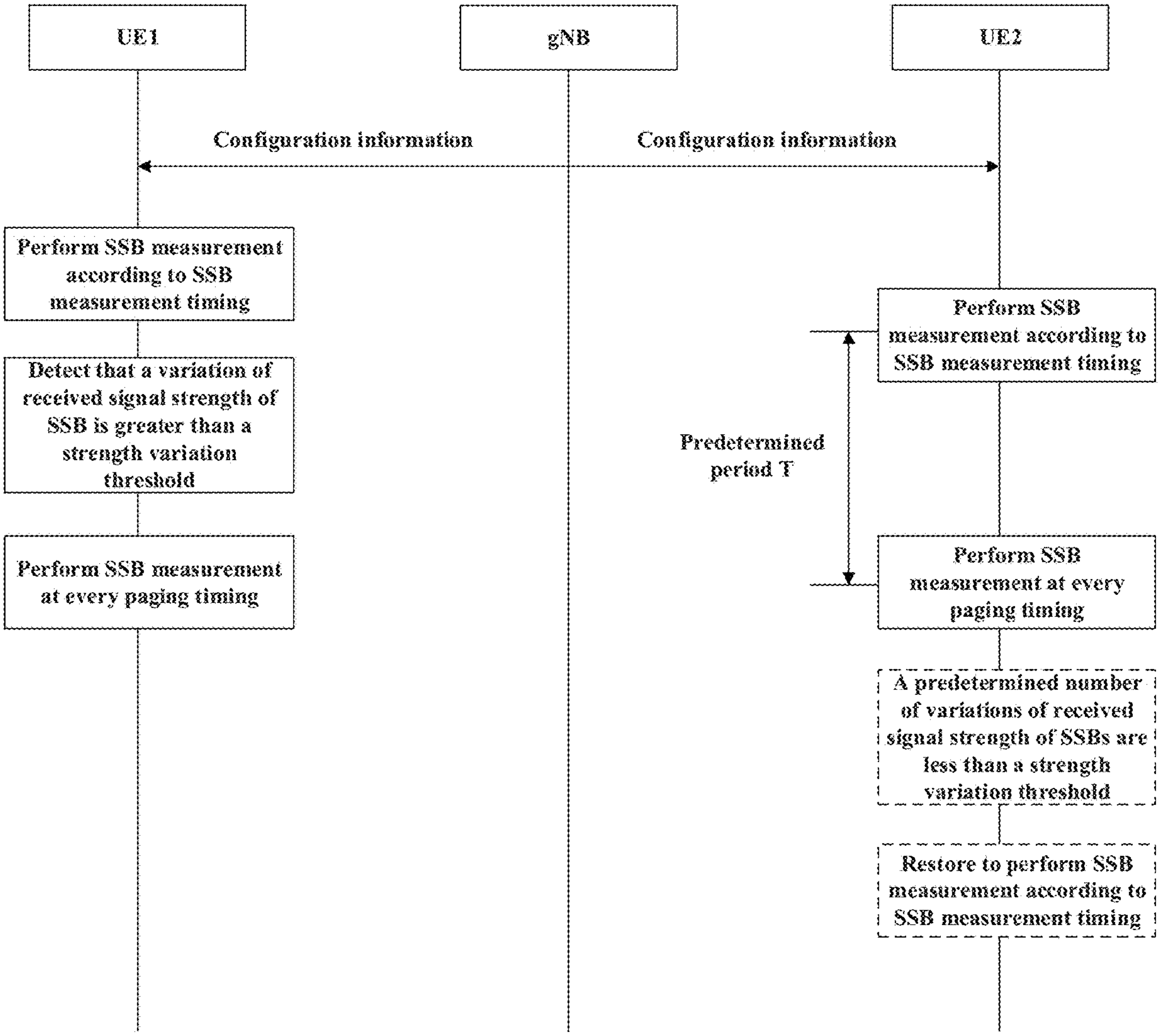
FIG. 17 schematically illustrates an exemplary information interaction according to a second variant of a second embodiment of the present disclosure.

FIG. 17 schematically illustrates interactive operations between a base station and a UE according to a second variant of a second embodiment of the present disclosure.

In FIG. 17, UE1 and UE2 may be two UEs served by the same base station. As described above, according to the second variation of the second embodiment, UE1 and UE2 are not necessarily two UEs that are geographically close and whose beam measurements are close.

As shown in FIG. 17, when the UE can change from a connected state to an idle state or an inactive state, the base station can transmit the above configuration information related to SSB measurement under the idle state or the inactive state to UE1 and UE2. For example, as described above, the configuration information may include information indicating SSB measurement timing, information indicating a strength variation threshold, and information indicating a predetermined period.

In response to receiving the configuration information, UE1 and UE2 may perform measurement on one or more SSBs according to the SSB measurement timing after entering the idle state or the inactive state. For example, the SSB measurement is performed in an indicated paging period in every N (N is an integer greater than 1) paging periods.

While performing the SSB measurement, UE1 and UE2 may each monitor changes in received signal strengths of the measured SSBs. In the example shown in FIG. 17, UE1 detects that the variation of received signal strength of an SSB is higher than the strength variation threshold. In response to this, UE1 stops performing SSB measurement according to SSB measurement timing, and restores to performing SSB measurement in every paging period. After a predetermined period T, UE2 actively transitions to performing SSB measurement in every paging period.

Subsequently, optionally, both UE1 and UE2 may further monitor the changes of received signal strengths of the SSBs during performing measurement on one or more SSBs corresponding thereto in every paging period. In response to for a predetermined number of consecutive measurements (e.g., 2 times or other suitable times), variations of received signal strength of each SSB of the one or more SSBs corresponding to UE1/UE2 with respect to received signal strength measured at a previous time are all less than or equal to the strength variation threshold indicated in the configuration information, UE1/UE2 may no longer perform SSB measurement in every paging period, instead, restore to perform SSB measurement according to the SSB measurement timing indicated in the configuration information.

Here, as an alternative, after the UE (for example, UE1 in FIG. 17) that detects that the variation of received signal strength of the SSB is higher than the strength variation threshold transitions to perform measurement in every paging period, it may also not monitor the change of received signal strength of the SSBs, and in turn no longer restore to perform SSB measurement according to the timing of SSB measurement, but remain normal SSB measurement until the UE enters the connected state again and the base station determines it as under the stationary status again.

The second variant of the second embodiment of the present disclosure has been described above in detail with reference to FIGS. 16-17. According to the second variant of the second embodiment, advantageously, it is possible to periodically restore to normal SSB measurement, thereby striking a balance between more accurate SSB measurement and lower power consumption.

The first embodiment and the second embodiment according to the present disclosure have been described in detail above with reference to the drawings. The first embodiment and the second embodiment can be implemented in combination. In this case, configuration information transmitted by a base station to a UE may include, for example, information indicating a strength threshold, information indicating SSB measurement timing, and information indicating a strength variation threshold, such that when the UE is under an idle state or an inactive state, it performs measurement on one or more SSBs which have received signal strength higher than the strength threshold when being under a connected state at the indicated SSB measurement timing, and transitions to perform measurement on the one or more SSBs in every paging period when the variation of received signal strength of any SSB is higher than the strength variation threshold. It should be noted that the specific implementation details of the first embodiment and the specific implementation details of the second embodiment may be combined in any degree. For example, the first embodiment may be combined with the first variant or the second variant of the second embodiment. For another example, when the variation of received signal strength of any SSB under the idle state or the inactive state is higher than the strength variation threshold, the UE may also transition to perform measurement on all of the plurality of SSBs corresponding to the UE in every paging period, and no longer perform selective measurement.

It should be understood that machine-executable instructions in a machine-readable storage medium or program product according to embodiments of the present disclosure can be configured to perform operations corresponding to the device and method embodiments described above. When referring to the above device and method embodiments, the embodiments of the machine-readable storage medium or program product will be apparent to those skilled in the art, and therefore description thereof will not be repeated. Machine-readable storage media and program products for carrying or including the above machine-executable instructions also fall within the scope of the present disclosure. Such storage media may include, but are not limited to, floppy disks, optical disks, magneto-optical disks, memory cards, memory sticks, and the like.

Figure 18:
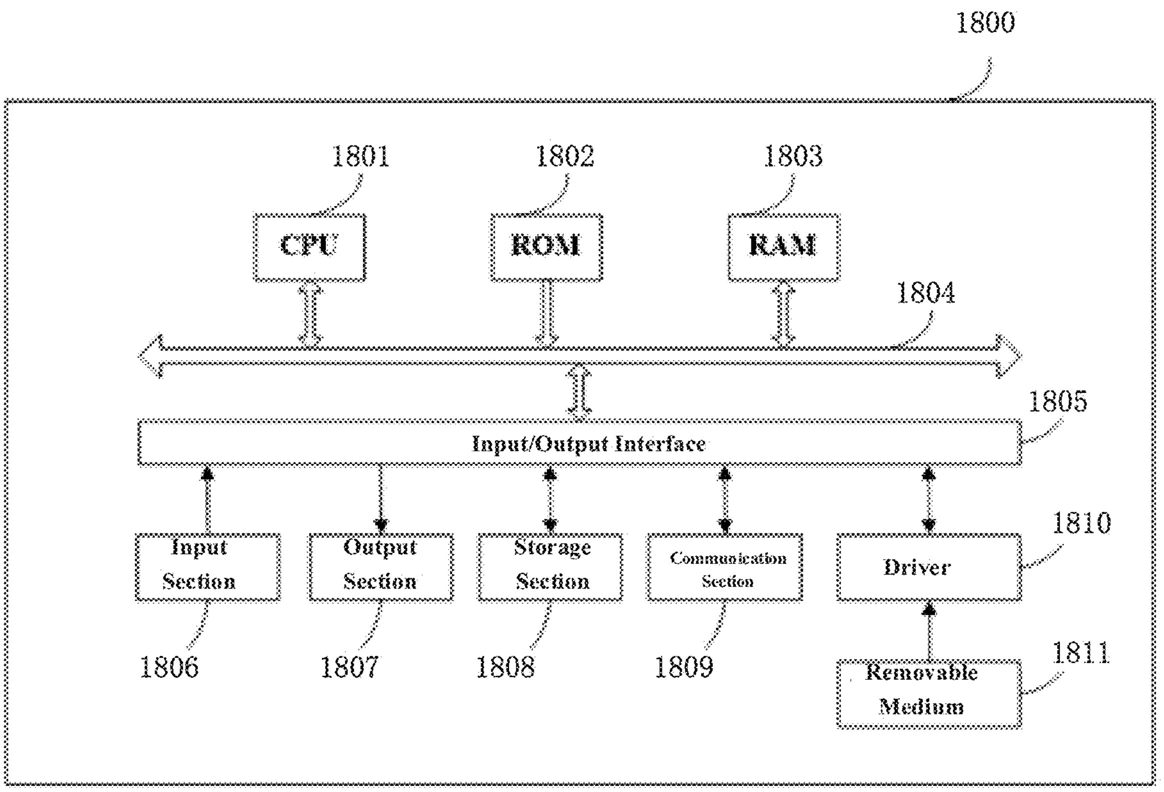
FIG. 18 is a block diagram of an example structure of a personal computer as an information processing device that can be employed in an embodiment of the present disclosure.

In addition, it should be understood that the series of processes and devices described above may also be implemented by software and/or firmware. In the case of be implemented by software and/or firmware, a program constituting the software is installed from a storage medium or a network to a computer having a dedicated hardware structure, for example, a general-purpose personal computer 1800 shown in FIG. 18, which, when installed with various programs, can perform various functions and the like. FIG. 18 is a block diagram showing an example structure of a personal computer as an information processing device that can be employed in an embodiment of the present disclosure. In one example, the personal computer may correspond to the above exemplary terminal device according to the present disclosure.

In FIG. 18, a central processing unit (CPU) 1801 executes various processes according to a program stored in a read only memory (ROM) 1802 or a program loaded from a storage section 1808 to a random access memory (RAM) 1803. In the RAM 1803, data required when the CPU 1801 executes various processes and the like is also stored as necessary.

The CPU 1801, ROM 1802, and RAM 1803 are connected to each other via a bus 1804. The input/output interface 1805 is also connected to the bus 1804.

The following components are connected to the input/output interface 1805: an input section 1806 including a keyboard, a mouse, etc.; an output section 1807 including a display such as a cathode ray tube (CRT), a liquid crystal display (LCD), etc., and a speaker, etc.; a storage section 1808, including a hard disk, etc.; and a communication section 1809, including a network interface card such as a LAN card, a modem, and the like. The communication section 1809 performs communication processing via a network such as the Internet.

A driver 1810 is also connected to the input/output interface 1805 as needed. A removable medium 1811 such as a magnetic disk, an optical disk, a magneto-optical disk, a semiconductor memory, and the like is mounted on the drive 1810 as needed, so that a computer program read therefrom is installed into the storage section 1808 as needed.

In the case that the series of processing described above is implemented by software, a program constituting the software is installed from a network such as the Internet or a storage medium such as a removable medium 1811.

Those skilled in the art should understand that such a storage medium is not limited to the removable medium 1811 shown in FIG. 18 in which a program is stored and distributed separately from the device to provide the program to the user. Examples of the removable medium 1811 include a magnetic disk (including a floppy disk (registered trademark)), an optical disk (including a compact disk read-only memory (CD-ROM) and digital versatile disk (DVD)), a magneto-optical disk (including a mini disc (MD) (registered trademark)) and a semiconductor memory. Alternatively, the storage medium may be the ROM 1802, a hard disk contained in the storage section 1808, or the like, in which programs are stored and distributed to users together with devices containing them.

The techniques of the present disclosure can be applied to various products.

For example, the electronic device 20 and the electronic device 130 according to an embodiment of the present disclosure may be implemented as or included in various control devices/base stations, and the methods shown in FIGS. 7 and 14 may also be implemented by various control devices/base stations. For example, the electronic device 10 and the electronic device 90 according to the embodiments of the present disclosure may be implemented as or included in various terminal devices/user devices, and the methods shown in FIGS. 5 and 12 may also be implemented by various terminal devices/user devices.

For example, the control device/base station mentioned in this disclosure can be implemented as any type of base station, e.g., an evolved Node B (gNB), such as a macro gNB and a small gNB. The small gNB may be a gNB covering a cell smaller than a macro cell, such as a pico gNB, a micro gNB, and a home (femto) gNB. Alternatively, the base station may be implemented as any other type of base station, such as a NodeB and a Base Transceiver Station (BTS). The base station may include: a body (also referred to as a base station device) configured to control wireless communication; and one or more Remote Radio Head (RRH) disposed at a different place from the body. In addition, various types of terminals to be described below can each operate as a base station by temporarily or semi-permanently performing base station functions.

For example, the terminal device mentioned in this disclosure, also referred to as a user device in some examples, can be implemented as a mobile terminal (such as a smart phone, a tablet personal computer (PC), a notebook PC, a portable game terminal, a portable/dongle type mobile router and a digital camera) or a vehicle-mounted terminal (such as a vehicle navigation device). The user device may also be implemented as a terminal performing machine-to-machine (M2M) communication (also referred to as a machine type communication (MTC) terminal). In addition, the user device may be a wireless communication module (such as an integrated circuit module including a single wafer) mounted on each of the above terminals.

Examples according to the present disclosure will be described below with reference to FIGS. 19 to 22.

[Examples about Base Stations]

It should be understood that the term base station in this disclosure has its full breadth of ordinary meaning and includes at least a wireless communication station used as part of a wireless communication system or a radio system to facilitate communication. Examples of base stations may be, for example but not limited to: a base station may be one or both of a base transceiver station (BTS) and a base station controller (BSC) in a GSM system, may be one or both of a radio network controller (RNC) and Node B in a WCDMA system, may be an eNB in a LTE and LTE-Advanced system, may be an gNB, eLTEeNB, etc. appearing in a 5G communication system, or may be a corresponding network node in a future communication system. Part of the functions in the base stations of the present disclosure may also be implemented as an entity that has control functions for communication in D2D, M2M and V2V communication scenarios, or as an entity that plays a spectrum coordination role in cognitive radio communication scenarios.

First Example

Figure 19:
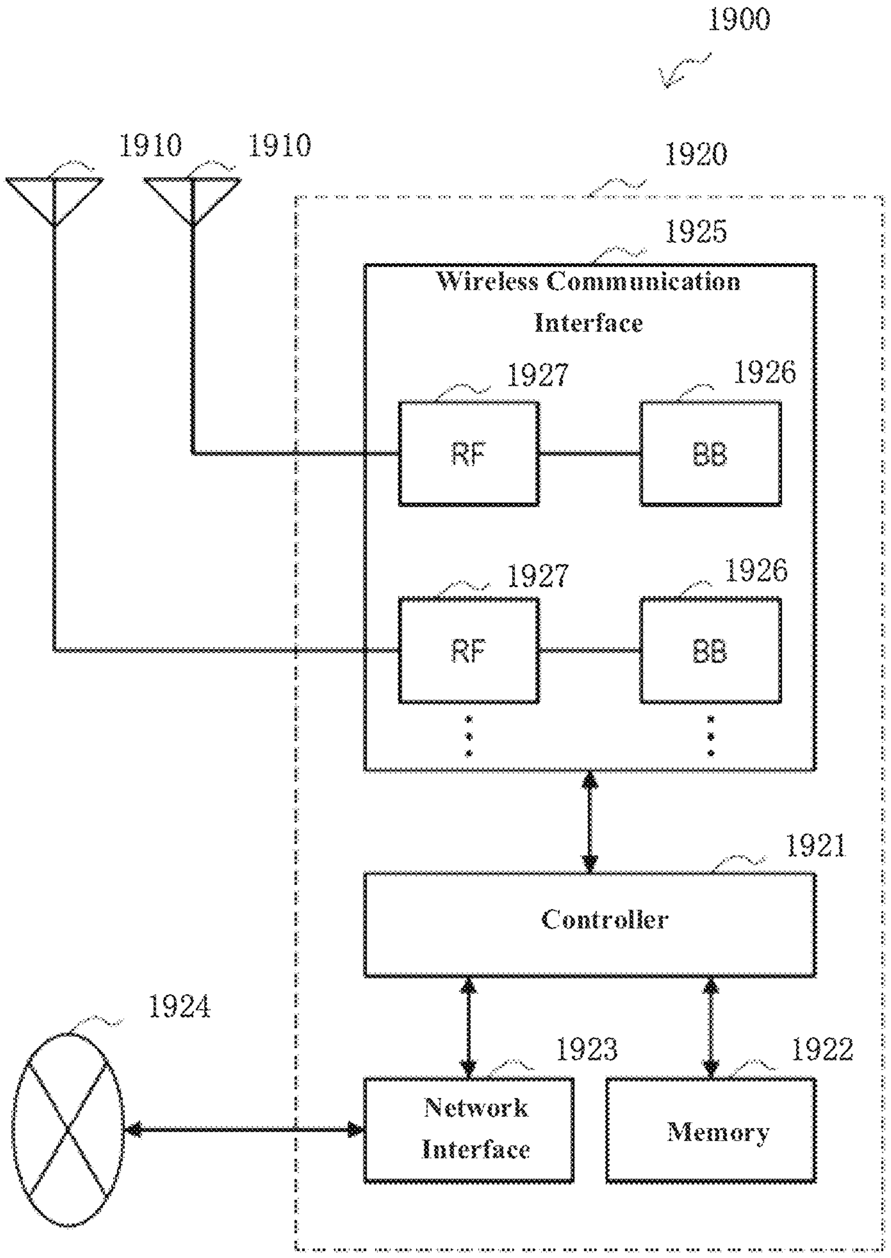
FIG. 19 is a block diagram showing a first example of a schematic configuration of a gNB to which the technology of the present disclosure can be applied.

FIG. 19 is a block diagram showing a first example of a schematic configuration of a gNB to which the technology of the present disclosure can be applied. The gNB 1900 includes multiple antennas 1910 and a base station device 1920. The base station device 1920 and each antenna 1910 may be connected to each other via an RF cable. In one implementation, the gNB 1900 (or the base station device 1920) here may correspond to the above electronic device 20 and/or 130.

Each of the antennas 1910 includes a single or multiple antenna elements (such as multiple antenna elements included in a Multiple Input Multiple Output (MIMO) antenna), and is used by the base station device 1920 to transmit and receive wireless signals. As shown in FIG. 19, the gNB 1900 may include multiple antennas 1910. For example, the multiple antennas 1910 may be compatible with multiple frequency bands used by the gNB 1900.

The base station device 1920 includes a controller 1921, a memory 1922, a network interface 1923 and a wireless communication interface 1925.

The controller 1921 may be, for example, a CPU or a DSP, and operates various functions of a higher layer of the base station device 1920. For example, the controller 1921 generates a data packet according to data in a signal processed by the wireless communication interface 1925 and transfers the generated packet via the network interface 1923. The controller 1921 may bundle data from a plurality of baseband processors to generate a bundled packet, and transfer the generated bundled packet. The controller 1921 may have logic functions to perform controls such as radio resource control, radio bearer control, mobility management, admission control and scheduling. These controls can be performed in conjunction with nearby gNB(s) or core network node(s). The memory 1922 includes RAM and ROM, and stores programs executed by the controller 1921 and various types of control data (such as a terminal list, transmission power data, and scheduling data).

The network interface 1923 is a communication interface for connecting the base station device 1920 to the core network 1924. The controller 1921 may communicate with a core network node or further gNB via the network interface 1923. In this case, the gNB 1900 and core network node(s) or other gNB(s) can be connected to each other through logical interfaces (such as S1 interface and X2 interface). The network interface 1923 may also be a wired communication interface or a wireless communication interface for wireless backhaul. If the network interface 1923 is a wireless communication interface, the network interface 1923 may use a higher frequency band for wireless communication than that used by the wireless communication interface 1925.

The wireless communication interface 1925 supports any cellular communication scheme (such as Long Term Evolution (LTE) and LTE-Advanced), and provides a wireless connection to a terminal located in a cell of the gNB 1900 via the antenna 1910. The wireless communication interface 1925 may generally include, for example, a baseband (BB) processor 1926 and an RF circuit 1927. The BB processor 1926 may perform, for example, encoding/decoding, modulation/demodulation, and multiplexing/demultiplexing, and performs various types of signal processing in layers (for example, L1, Medium Access Control (MAC), Radio Link Control (RLC), and Packet Data Convergence Protocol (PDCP)). In place of the controller 1921, the BB processor 1926 may have part or all of the logic functions described above. The BB processor 1926 may be a memory storing a communication control program, or a module including a processor and related circuits configured to execute the program. Updating the program may cause the functionality of the BB processor 1926 to change. The module may be a card or a blade inserted into a slot of the base station device 1920. Alternatively, the module can also be a chip mounted on a card or blade. Meanwhile, the RF circuit 1927 may include, for example, a mixer, a filter, and an amplifier, and transmit and receive wireless signals via the antenna 1910. Although FIG. 19 illustrates an example in which one RF circuit 1927 is connected to one antenna 1910, the present disclosure is not limited to this, instead, one RF circuit 1927 may be connected to multiple antennas 1910 at the same time.

As shown in FIG. 19, the wireless communication interface 1925 may include multiple BB processors 1926. For example, the multiple BB processors 1926 may be compatible with multiple frequency bands used by the gNB 1900. As shown in FIG. 19, the wireless communication interface 1925 may include multiple RF circuits 1927. For example, the multiple RF circuits 1927 may be compatible with multiple antenna elements. Although FIG. 19 illustrates an example in which the wireless communication interface 1925 includes multiple BB processors 1926 and multiple RF circuits 1927, the wireless communication interface 1925 may also include a single BB processor 1926 or a single RF circuit 1927.

Second Example

Figure 20:
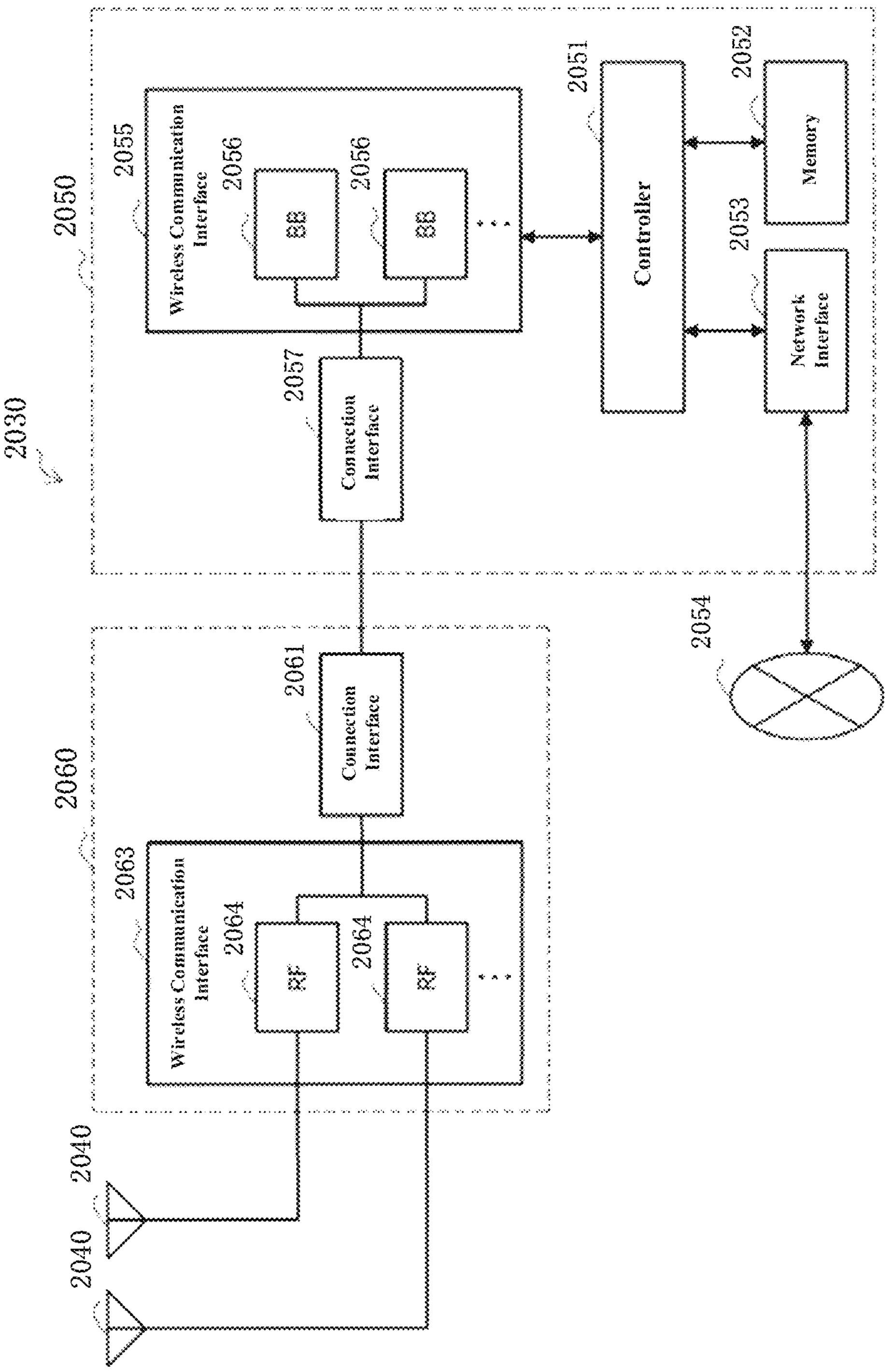
FIG. 20 is a block diagram showing a second example of a schematic configuration of a gNB to which the technology of the present disclosure can be applied.

FIG. 20 is a block diagram showing a second example of a schematic configuration of a gNB to which the technology of the present disclosure can be applied. The gNB 2030 includes multiple antennas 2040, a base station device 2050 and a RRH 2060. The RRH 2060 and each antenna 2040 may be connected to each other via RF cables. The base station device 2050 and the RRH 2060 can be connected to each other via a high-speed line such as an optical fiber cable. In one implementation, the gNB 2030 (or the base station device 2050) here may correspond to the above electronic device 20 and/or 130.

Each of the antennas 2040 includes a single or multiple antenna elements (such as multiple antenna elements included in a MIMO antenna), and is used by the RRH 2060 to transmit and receive wireless signals. As shown in FIG. 20, the gNB 2030 may include multiple antennas 2040. For example, the multiple antennas 2040 may be compatible with multiple frequency bands used by the gNB 2030.

The base station device 2050 includes a controller 2051, a memory 2052, a network interface 2053, a wireless communication interface 2055 and a connection interface 2057. The controller 2051, the memory 2052, and the network interface 2053 are the same as the controller 1921, the memory 1922, and the network interface 1923 described with reference to FIG. 19.

The wireless communication interface 2055 supports any cellular communication scheme (such as LTE and LTE-Advanced), and provides wireless communication to terminals located in a sector corresponding to the RRH 2060 via the RRH 2060 and the antenna 2040. The wireless communication interface 2055 may generally include, for example, a BB processor 2056. The BB processor 2056 is the same as the BB processor 1926 described with reference to FIG. 19, except that the BB processor 2056 is connected to the RF circuit 2064 of the RRH 2060 via the connection interface 2057. As shown in FIG. 20, the wireless communication interface 2055 may include multiple BB processors 2056. For example, the multiple BB processors 2056 may be compatible with multiple frequency bands used by the gNB 2030. Although FIG. 20 illustrates an example in which the wireless communication interface 2055 includes multiple BB processors 2056, the wireless communication interface 2055 may also include a single BB processor 2056.

The connection interface 2057 is an interface for connecting the base station device 2050 (the wireless communication interface 2055) to the RRH 2060. The connection interface 2057 may also be a communication module for communication in the above high-speed line connecting the base station device 2050 (the wireless communication interface 2055) to the RRH 2060.

The RRH 2060 includes a connection interface 2061 and a wireless communication interface 2063.

The connection interface 2061 is an interface for connecting the RRH 2060 (the wireless communication interface 2063) to the base station device 2050. The connection interface 2061 may also be a communication module for communication in the above high-speed line.

The wireless communication interface 2063 transmits and receives wireless signals via the antenna 2040. The wireless communication interface 2063 may generally include an RF circuit 2064, for example. The RF circuit 2064 may include, for example, a mixer, a filter, and an amplifier, and transmits and receives wireless signals via the antenna 2040. Although FIG. 20 illustrates an example in which one RF circuit 2064 is connected to one antenna 2040, the present disclosure is not limited to this, instead, one RF circuit 2064 may be connected to multiple antennas 2040 at the same time.

As shown in FIG. 20, the wireless communication interface 2063 may include multiple RF circuits 2064. For example, the multiple RF circuits 2064 may support multiple antenna elements. Although FIG. 20 illustrates an example in which the wireless communication interface 2063 includes multiple RF circuits 2064, the wireless communication interface 2063 may also include a single RF circuit 2064.

[Example about User Device]

First Example

Figure 21:
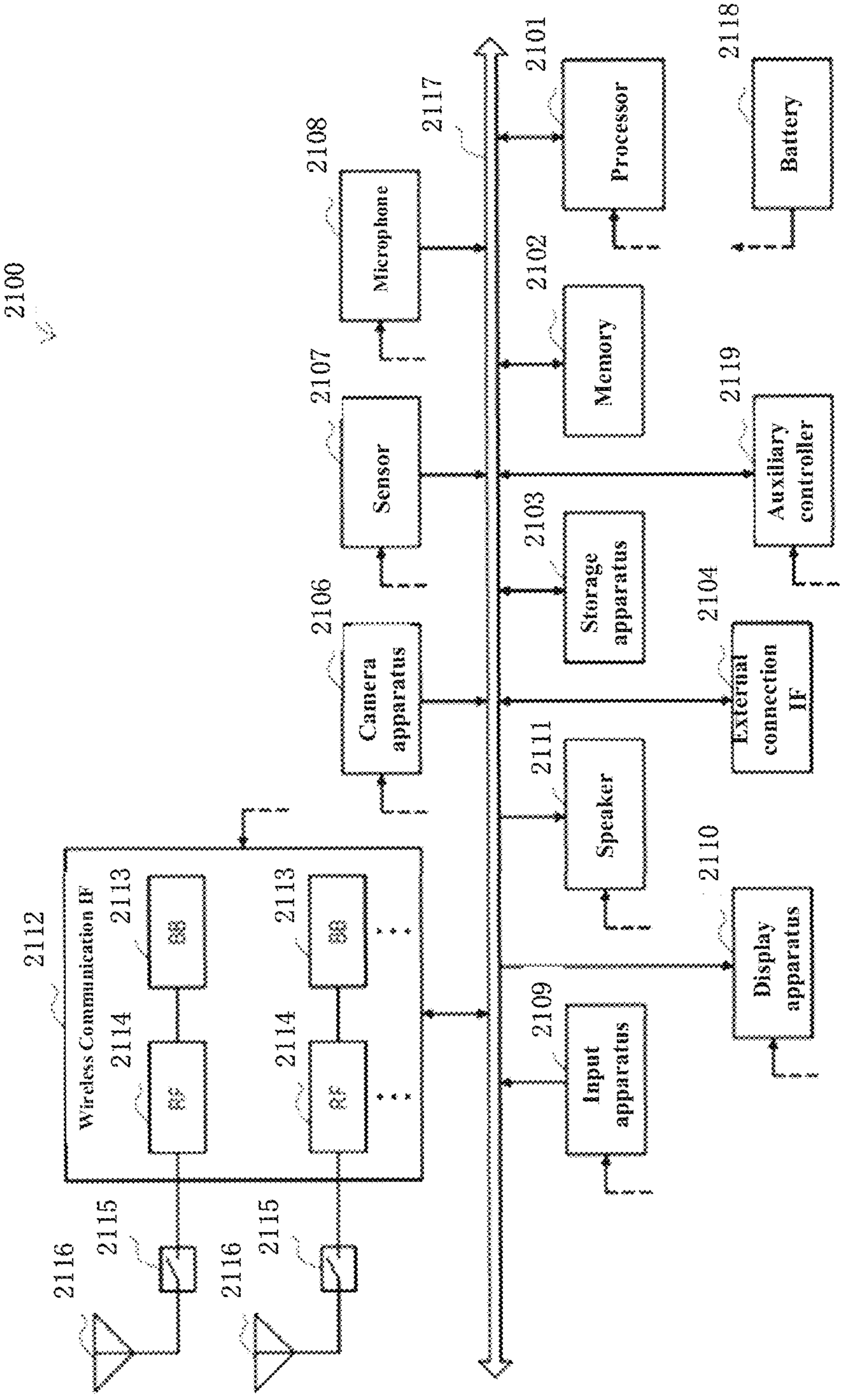
FIG. 21 is a block diagram showing an example of a schematic configuration of a smart phone to which the technology of the present disclosure can be applied.

FIG. 21 is a block diagram showing an example of a schematic configuration of a smart phone 2100 to which the technology of the present disclosure can be applied. The smart phone 2100 includes a processor 2101, a memory 2102, a storage apparatus 2103, an external connection interface 2104, a camera apparatus 2106, a sensor 2107, a microphone 2108, an input apparatus 2109, a display apparatus 2110, a speaker 2111, a wireless communication interface 2112, one or more antenna switches 2115, one or more antennas 2116, a bus 2117, a battery 2118, and an auxiliary controller 2119. In one implementation, the smart phone 2100 (or the processor 2101) here may correspond to the above terminal device 300B and/or 1500A.

The processor 2101 may be, for example, a CPU or a system on chip (SoC), and controls functions of an application layer and further layers of the smart phone 2100. The memory 2102 includes RAM and ROM, and stores data and programs executed by the processor 2101. The storage apparatus 2103 may include a storage medium such as a semiconductor memory and a hard disk. The external connection interface 2104 is an interface for connecting an external apparatus (such as a memory card and a universal serial bus (USB) apparatus) to the smart phone 2100.

The camera apparatus 2106 includes an image sensor (such as a charge coupled device (CCD) and a complementary metal oxide semiconductor (CMOS)), and generates captured images. The sensor 2107 may include a set of sensors, such as a measurement sensor, a gyro sensor, a geomagnetic sensor, and an acceleration sensor. The microphone 2108 converts sound input to the smart phone 2100 into an audio signal. The input apparatus 2109 includes, for example, a touch sensor configured to detect a touch on the screen of the display apparatus 2110, a keypad, a keyboard, a button, or a switch, and receives operations or information input from a user. The display apparatus 2110 includes a screen (such as a liquid crystal display (LCD) and an organic light emitting diode (OLED) display), and displays an output image of the smart phone 2100. The speaker 2111 converts an audio signal output from the smart phone 2100 into sound.

The wireless communication interface 2112 supports any cellular communication scheme (such as LTE and LTE-Advanced), and performs wireless communication. The wireless communication interface 2112 may generally include, for example, a BB processor 2113 and an RF circuit 2119. The BB processor 2113 can perform, for example, encoding/decoding, modulation/demodulation, and multiplexing/demultiplexing, and perform various types of signal processing for wireless communication. Meanwhile, the RF circuit 2114 may include, for example, a mixer, a filter, and an amplifier, and transmit and receive wireless signals via the antenna 2116. The wireless communication interface 2112 may be a chip module on which a BB processor 2113 and an RF circuit 2114 are integrated. As shown in FIG. 21, the wireless communication interface 2112 may include multiple BB processors 2113 and multiple RF circuits 2114. Although FIG. 21 illustrates an example in which the wireless communication interface 2112 includes multiple BB processors 2113 and multiple RF circuits 2114, the wireless communication interface 2112 may include a single BB processor 2113 or a single RF circuit 2114.

Furthermore, the wireless communication interface 2112 may support another type of wireless communication scheme, such as a short-range wireless communication scheme, a near field communication scheme, and a wireless local area network (LAN) scheme, in addition to the cellular communication schemes. In this case, the wireless communication interface 2112 may include a BB processor 2113 and an RF circuit 2114 for each wireless communication scheme.

Each of the antenna switches 2115 switches the connection destination of the antenna 2116 among a plurality of circuits (e.g., circuits for different wireless communication schemes) included in the wireless communication interface 2112.

Each of the antennas 2116 includes a single or multiple antenna elements (such as multiple antenna elements included in a MIMO antenna), and is used for the wireless communication interface 2112 to transmit and receive wireless signals. As shown in FIG. 21, the smart phone 2100 may include multiple antennas 2116. Although FIG. 21 shows an example in which the smart phone 2100 includes multiple antennas 2116, the smart phone 2100 may also include a single antenna 2116.

In addition, the smart phone 2100 may include an antenna 2116 for each wireless communication scheme. In this case, the antenna switch 2115 may be omitted from the configuration of the smart phone 2100.

The bus 2117 connects the processor 2101, the memory 2102, the storage apparatus 2103, the external connection interface 2104, the camera apparatus 2106, the sensor 2107, the microphone 2108, the input apparatus 2109, the display apparatus 2110, the speaker 2111, the wireless communication interface 2112, and the auxiliary controller 2119 to each other. The battery 2118 provides power to the various blocks of the smart phone 2100 shown in FIG. 21 via feed lines, which are partially shown as dashed lines in the figure. The auxiliary controller 2119 operates minimum necessary functions of the smart phone 2100, for example, in a sleep mode.

Second Example

Figure 22:
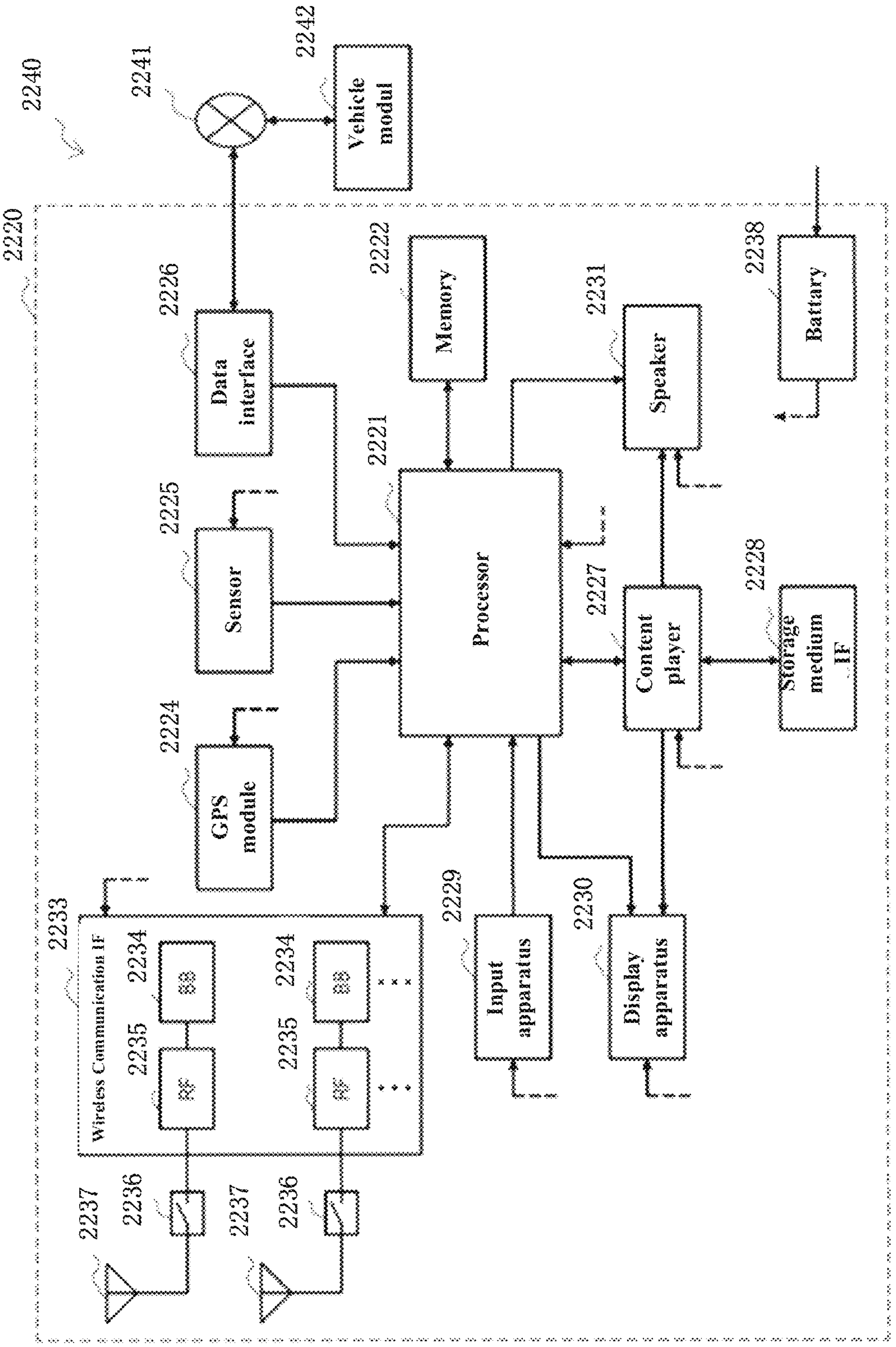
FIG. 22 is a block diagram showing an example of a schematic configuration of a vehicle navigation device to which the technology of the present disclosure can be applied.

FIG. 22 is a block diagram showing an example of a schematic configuration of a vehicle navigation device 2220 to which the technology of the present disclosure can be applied. The vehicle navigation device 2220 includes a processor 2221, a memory 2222, a global positioning system (GPS) module 2224, a sensor 2225, a data interface 2226, a content player 2227, a storage medium interface 2228, an input apparatus 2229, a display apparatus 2230, a speaker 2231, a wireless communication interface 2233, one or more antenna switches 2236, one or more antennas 2237, and a battery 2238. In one implementation, the vehicle navigation device 2220 (or the processor 2221) here may correspond to the above terminal device 300B and/or 1500A.

The processor 2221 may be, for example, a CPU or a SoC, and controls a navigation function and other functions of the vehicle navigation device 2220. The memory 2222 includes RAM and ROM, and stores data and programs executed by the processor 2221.

The GPS module 2224 measures the location (such as latitude, longitude, and altitude) of the vehicle navigation device 2220 using GPS signals received from GPS satellites. The sensor 2225 may include a set of sensors such as a gyro sensor, a geomagnetic sensor, and an air pressure sensor. The data interface 2226 is connected to, for example, an in-vehicle network 2241 via a terminal not shown, and acquires data (such as vehicle speed data) generated by the vehicle.

The content player 2227 reproduces content stored in storage medium (such as a CD and a DVD), which is inserted into the storage medium interface 2228. The input apparatus 2229 includes, for example, a touch sensor configured to detect a touch on the screen of the display apparatus 2230, a button, or a switch, and receives operations or information input from a user. The display apparatus 2230 includes a screen such as an LCD or OLED display, and displays an image of a navigation function or reproduced content. The speaker 2231 outputs sound of the navigation function or reproduced content.

The wireless communication interface 2233 supports any cellular communication scheme (such as LTE and LTE-Advanced), and performs wireless communication. The wireless communication interface 2233 may generally include, for example, a BB processor 2234 and an RF circuit 2235. The BB processor 2234 may perform, for example, encoding/decoding, modulation/demodulation, and multiplexing/demultiplexing, and perform various types of signal processing for wireless communication. Meanwhile, the RF circuit 2235 may include, for example, a mixer, a filter, and an amplifier, and transmit and receive wireless signals via the antenna 2237. The wireless communication interface 2233 can also be a chip module on which the BB processor 2234 and the RF circuit 2235 are integrated. As shown in FIG. 22, the wireless communication interface 2233 may include multiple BB processors 2234 and multiple RF circuits 2235. Although FIG. 22 illustrates an example in which the wireless communication interface 2233 includes multiple BB processors 2234 and multiple RF circuits 2235, the wireless communication interface 2233 may also include a single BB processor 2234 or a single RF circuit 2235.

Furthermore, the wireless communication interface 2233 may support another type of wireless communication scheme, such as a short-range wireless communication scheme, a near field communication scheme, and a wireless LAN scheme, in addition to the cellular communication schemes. In this case, the wireless communication interface 2233 may include the BB processor 2234 and the RF circuit 2235 for each wireless communication scheme.

Each of the antenna switches 2236 switches the connection destination of the antenna 2237 among a plurality of circuits (such as circuits for different wireless communication schemes) included in the wireless communication interface 2233.

Each of the antennas 2237 includes a single or multiple antenna elements (such as multiple antenna elements included in a MIMO antenna), and is used for the wireless communication interface 2233 to transmit and receive wireless signals. As shown in FIG. 22, the vehicle navigation device 2220 may include multiple antennas 2237. Although FIG. 22 illustrates an example in which the vehicle navigation device 2220 includes multiple antennas 2237, the vehicle navigation device 2220 may also include a single antenna 2237.

Furthermore, the vehicle navigation device 2220 may include an antenna 2237 for each wireless communication scheme. In this case, the antenna switch 2236 can be omitted from the configuration of the vehicle navigation device 2220.

The battery 2238 provides power to various blocks of the vehicle navigation device 2220 shown in FIG. 22 via feeder lines, which are partially shown as dashed lines in the figure. The battery 2238 accumulates electric power supplied from the vehicle.

The technology of the present disclosure may also be implemented as an in-vehicle system (or vehicle) 2240 including one or more blocks of the vehicle navigation device 2220, the in-vehicle network 2241, and the vehicle module 2242. The vehicle module 2242 generates vehicle data (such as vehicle speed, engine speed, and fault information), and outputs the generated data to the in-vehicle network 2241.

The exemplary embodiments of the present disclosure have been described above with reference to the accompanying drawings, but the present disclosure is of course not limited to the above examples. Those skilled in the art may find various alterations and modifications within the scope of the appended claims, and it should be understood that these alterations and modifications will naturally fall within the technical scope of the present disclosure.

It should be understood that machine-executable instructions in a machine-readable storage medium or program product according to embodiments of the present disclosure can be configured to perform operations corresponding to the device and method embodiments described above. When referring to the above device and method embodiments, the embodiments of the machine-readable storage medium or program product will be apparent to those skilled in the art, and therefore description thereof will not be repeated. Machine-readable storage media and program products for carrying or including the above machine-executable instructions also fall within the scope of the present disclosure. Such storage media may include, but are not limited to, floppy disks, optical disks, magneto-optical disks, memory cards, memory sticks, and the like.

In addition, it should be understood that the series of processes and devices described above may also be implemented by software and/or firmware. In the case of be implemented by software and/or firmware, corresponding programs constituting corresponding software are stored in a storage medium of a relevant device (for example, the memory 102, 202, 902, or 1302 of the electronic device 10 shown in FIG. 2, the electronic device 20 shown in FIG. 6, the electronic device 90 shown in FIG. 9 or the electronic device 130 shown in FIG. 13), which, when executed, can perform various functions.

For example, a plurality of functions included in one unit in the above embodiments may be implemented by separate apparatus. Alternatively, the plurality of functions implemented by multiple units in the above embodiments may be implemented by separate apparatus, respectively. Additionally, one of the above functions may be implemented by multiple units. Needless to say, such a configuration is included in the technical scope of the present disclosure.

In this specification, the steps described in the flowchart include not only processes performed in time sequence in the stated order, but also processes performed in parallel or individually rather than necessarily in time sequence. Furthermore, even in the steps processed in time sequence, needless to say, the order can be appropriately changed.

Although the present disclosure and its advantages have been described in detail, it should be understood that various changes, substitutions and alterations can be made herein without departing from the spirit and scope of the disclosure as defined by the appended claims. Furthermore, the terms "comprise", "include" or any other variation thereof in embodiments of the present disclosure are intended to encompass a non-exclusive inclusion, such that a process, method, article or device comprising a series of elements includes not only those elements, but also include other elements not expressly listed, or include elements inherent to such process, method, article or device. Without further limitation, an element defined by the phrase "comprising one . . . " does not preclude the presence of additional identical elements in a process, method, article or device that includes the element.

In addition, the present disclosure may also have the following configurations:

(1) An electronic device for a terminal device side of a wireless communication system, comprising:

a processing circuitry, configured to:

receive, from a base station, configuration information indicating performing measurement on one or more Synchronization Signal Blocks, SSBs of a plurality of SSBs corresponding to the electronic device when the electronic device is under an idle state or an inactive state, wherein the configuration information is transmitted based on the electronic device being in a stationary status, and the configuration information at least comprises information indicating a first threshold; and perform measurement, during the electronic device being under the idle state or the inactive state, only on one or more SSBs of the plurality of SSBs which have received signal strength higher than the first threshold when the electronic device is under a connected state.

(2) The electronic device of (1), wherein the stationary status indicates the electronic device is not displaced and is not rotated.

(3) The electronic device of (2), wherein the electronic device being not displaced is determined at least based on a variation of received signal strength of each SSB of corresponding SSBs received by the electronic device from the base station of a serving cell and a variation of received signal strength of each SSB of corresponding SSBs received by the electronic device from base stations of two neighbor cells being all less than a second threshold, within a predetermined time period under the connected state; and the electronic device being not rotated is determined at least based on a magnitude relation among received signal strength of the corresponding SSBs received by the electronic device from the base station of the serving cell and a magnitude relation among received signal strength of corresponding SSBs received by the electronic device from a base station of a neighbor cell being both substantially unchanged, within the predetermined time period under the connected state.

(4) The electronic device of (1) or (2), wherein the configuration information further comprises information indicating a third threshold, and the processing circuitry is further configured to perform measurement on each SSB of the plurality of SSBs corresponding to the electronic device in response to a variation of received signal strength of any SSB of the one or more SSBs measured during the electronic device being under the idle state or the inactive state with respect to received signal strength of the SSB measured at a previous time being higher than the third threshold.

(5) The electronic device of (1) or (2), wherein the processing circuitry is further configured to transmit information assisting in determination of the stationary status to the base station, the information assisting in determination of the stationary status comprising at least information indicating a type of the electronic device and/or information related to received signal strength of historical downlink reference signals.

(6) The electronic device of (1) or (2), wherein the configuration information further comprises information indicating SSB measurement timing and information indicating a fourth threshold, and the SSB measurement timing is within a paging period of every N paging periods, N being an integer greater than 1; and the processing circuitry is further configured to perform the following operations during the electronic device being under the idle state or the inactive state:

performing measurement on the one or more SSBs according to the SSB measurement timing, and performing SSB measurement in every paging period in response to a variation of received signal strength of any of the measured one or more SSBs with respect to received signal strength measured at a previous time being higher than the fourth threshold.

(7) a Method for a Terminal Device Side of a Wireless communication system, comprising:

receiving, from a base station, configuration information indicating performing measurement on one or more Synchronization Signal Blocks, SSBs of a plurality of SSBs corresponding to the terminal device when the terminal device is under an idle state or an inactive state, wherein the configuration information is transmitted based on the terminal device being in a stationary status, and the configuration information at least comprises information indicating a first threshold; and performing measurement, during the terminal device being under the idle state or the inactive state, only on one or more SSBs of the plurality of SSBs which have received signal strength higher than the first threshold when the terminal device is under a connected state.

(8) An electronic device for a control device side of a wireless communication system, comprising:

a processing circuitry configured to:

determine if a terminal device is in a stationary status; and in response to determining the terminal device is in the stationary status, transmit, to the terminal device, configuration information indicating performing measurement on one or more Synchronization Signal Blocks, SSBs of a plurality of SSBs corresponding to the terminal device when the terminal device is under an idle state or an inactive state, wherein the configuration information at least comprises information indicating a first threshold, such that the terminal device performs measurement, during the terminal device being under the idle state or the inactive state, only on one or more SSBs of the plurality of SSBs which have received signal strength higher than the first threshold when the terminal device is under a connected state.

(9) The electronic device of (8), wherein the stationary status indicates the terminal device is not displaced and is not rotated.

(10) The electronic device of (9), wherein the processing circuitry determines the terminal device being not displaced at least based on a variation of received signal strength of each SSB of corresponding SSBs received by the terminal device from the electronic device and a variation of received signal strength of each SSB of corresponding SSBs received by the terminal device from base stations of two neighbor cells being all less than a second threshold, within a predetermined time period under the connected state of the terminal device; and the processing circuitry determines the terminal device being not rotated at least based on a magnitude relation among received signal strength of the corresponding SSBs received by the terminal device from the electronic device and a magnitude relation among received signal strength of corresponding SSBs received by the terminal device from a base station of a neighbor cell being both substantially unchanged, within the predetermined time period under the connected state of the terminal device.

(11) The electronic device of (8) or (9), wherein the configuration information further comprises information indicating a third threshold, wherein the third threshold indicates: if a variation of received signal strength of any SSB of the one or more SSBs measured during the terminal device being the idle state or the inactive state with respect to received signal strength of the SSB measured at a previously time being higher than the third threshold, the terminal device should perform measurement on each SSB of the plurality of SSBs corresponding to the terminal device.

(12) The electronic device of (10), wherein the processing circuitry is further configured to:

receive information assisting in determination of stationary status from the terminal device, the information assisting in determination of stationary status comprising at least information indicating a type of the terminal device and/or information related to received signal strength of historical downlink reference signals, and determine whether the terminal device is in a stationary status also based on the information assisting in determination of the stationary status.

(13) The electronic device of (8) or (9), wherein the configuration information further comprises information indicating SSB measurement timing and information indicating a fourth threshold, and the SSB measurement timing is within a paging period of every N paging periods, N being an integer greater than 1, so that the terminal device, during being under the idle state or the inactive state:

performs measurement on the one or more SSBs according to the SSB measurement timing, and performs SSB measurement in every paging period in response to a variation of received signal strength of any of the measured one or more SSBs with respect to received signal strength measured at a previous time being higher than the fourth threshold.

(14) A method for a control device side of a wireless communication system, comprising:

determining if a terminal device is in a stationary status; and in response to determining the terminal device is in the stationary status, transmitting, to the terminal device, configuration information indicating performing measurement on one or more Synchronization Signal Blocks, SSBs of a plurality of SSBs corresponding to the terminal device when the terminal device is under an idle state or an inactive state, wherein the configuration information at least comprises information indicating a first threshold, such that the terminal device performs measurement, during the terminal device being under the idle state or the inactive state, only on one or more SSBs of the plurality of SSBs which have received signal strength higher than the first threshold when the terminal device is under a connected state.

(15) An electronic device for a terminal device side of a wireless communication system, comprising:

a processing circuitry configured to:

receive, from a base station, configuration information indicating performing measurement on one or more Synchronization Signal Blocks, SSBs corresponding to the electronic device when the electronic device is under an idle state or an inactive state, wherein the configuration information is transmitted based on the terminal device being in a stationary status, and the configuration information at least comprises information indicating SSB measurement timing and information indicating a first threshold, and the SSB measurement timing is within a paging period of every N paging periods, N being an integer greater than 1; and perform the following operations during the electronic device being under the idle state or the inactive state:

performing measurement on the one or more SSBs according to the SSB measurement timing, and performing measurement on the one or more SSBs in every paging period in response to a variation of received signal strength of any of the measured one or more SSBs with respect to received signal strength measured at a previous time being higher than the first threshold.

(16) The electronic device of (15), wherein the SSB measurement timing is determined based on a group of terminal devices including the electronic device, wherein the group of electronic devices includes a plurality of terminal devices that are geographically close and whose beam measurements are close.

(17) The electronic device of (15) or (16), wherein the stationary status indicates the electronic device is not displaced and is not rotated, wherein the electronic device being not displaced is determined at least based on a variation of received signal strength of each SSB of the one or more SSBs received by the electronic device from the base station of a serving cell and a variation of received signal strength of each SSB of corresponding SSBs received by the electronic device from base stations of two neighbor cells being all less than a second threshold, within a predetermined time period under the connected state; and the electronic device being not rotated is determined at least based on a magnitude relation among received signal strength of the one or more SSBs received by the electronic device from the base station of the serving cell and a magnitude relation among received signal strength of corresponding SSBs received by the electronic device from a base station of a neighbor cell being both substantially unchanged, within the predetermined time period under the connected state.

(18) The electronic device of (15) or (16), the processing circuitry is further configured to:

in response to a variation of received signal strength of any of the measured one or more SSBs with respect to received signal strength measured at a previous time being greater than the first threshold, switch from the idle state or the inactive state to the connected state and transmit the measurements of the one or more SSBs to the base station, such that the base station notifies one or more terminal devices under an idle state or an inactive state that are geographically close and whose beam measurements are close to the electronic device of performing measurement on one or more SSBs corresponding to a respective terminal device in every paging period respectively.

(19) The electronic device of (15) or (16), the processing circuitry is further configured to:

receive, from the base station, information indicating performing measurement on the one or more SSBs in every paging period during the idle state or the inactive state.

(20) The electronic device of (19), wherein the processing circuitry is further configured to:

in the case of the one or more SSBs being measured in every paging period, perform measurement on the one or more SSBs according to the SSB measurement timing in response to for a predetermined number of consecutive measurements, a variation of received signal strength of each SSB of the one or more SSBs with respect to received signal strength measured at a previous time being all less than or equal to the first threshold.

(21) An electronic device of (15) or (16), wherein, the configuration information further comprises information indicating a predetermined period, the predetermined period including M paging periods, M being an integer multiple of N, and the processing circuitry is further configured to:

every time the predetermined period passes during performing measurement on the one or more SSBs according to the SSB measurement timing, transition from performing measurement on the one or more SSBs according to the SSB measurement timing to performing measurement on the one or more SSBs in every paging period, and in the case of the one or more SSBs being measured in every paging period, restore to perform measurement on the one or more SSBs according to the SSB measurement timing in response to for a predetermined number of consecutive measurements, a variation of received signal strength of each SSB of the one or more SSBs with respect to received signal strength measured at a previous time being all less than or equal to the first threshold.

(22) The electronic device of (15) or (16), wherein, the configuration information further comprises information indicating a third threshold, and the processing circuitry is further configured to perform measurement, during the electronic device being under the idle state or the inactive state, only on one or more SSBs which have received signal strength higher than the third threshold when the electronic device is under a connected state.

(23) A method for a terminal device side of a wireless communication system, comprising:

receiving, from a base station, configuration information indicating performing measurement on one or more Synchronization Signal Blocks, SSBs corresponding to the electronic device when the electronic device is under an idle state or an inactive state, wherein the configuration information is transmitted based on the terminal device being in a stationary status, and the configuration information at least comprises information indicating SSB measurement timing and information indicating a first threshold, and the SSB measurement timing is within a paging period of every N paging periods, N being an integer greater than 1; and during the electronic device being under the idle state or the inactive state:

performing measurement on the one or more SSBs according to the SSB measurement timing, and performing measurement on the one or more SSBs in every paging period in response to a variation of received signal strength of any of the measured one or more SSBs with respect to received signal strength measured at a previous time being higher than the first threshold.

(24) An electronic device for a control device side of a wireless communication system, comprising:

a processing circuitry configured to:

determine if a terminal device is in a stationary status; and in response to determining the terminal device is in the stationary status, transmit, to the terminal device, configuration information indicating performing measurement on one or more Synchronization Signal Blocks, SSBs corresponding to the terminal device when the terminal device is under an idle state or an inactive state, wherein the configuration information at least comprises information indicating SSB measurement timing and information indicating a first threshold, and the SSB measurement timing is within a paging period of every N paging periods, N being an integer greater than 1, such that the terminal device, during being under the idle state or the inactive state:

performs measurement on the one or more SSBs according to the SSB measurement timing, and performs measurement on the one or more SSBs in every paging period in response to a variation of received signal strength of any of the measured one or more SSBs with respect to received signal strength measured at a previous time being higher than the first threshold.

(25) The electronic device of (24), wherein the processing circuitry is further configured to:

divide a plurality of terminal devices that are geographically close and whose beam measurements are close into a group of terminal devices; and determine the SSB measurement timing for each terminal device in each group of terminal devices based on the grouping result.

(26) An electronic device of (24) or (25), wherein the stationary status indicates the terminal device is not displaced and is not rotated, wherein the processing circuitry determines the terminal device being not displaced at least based on a variation of received signal strength of the one or more SSBs received by the terminal device from the electronic device and a variation of received signal strength of each SSB of corresponding SSBs received by the terminal device from base stations of two neighbor cells being all less than a second threshold, within a predetermined time period under a connected state of the terminal device; and the processing circuitry determines the terminal device being not rotated at least based on a magnitude relation among received signal strength of the one or more SSBs received by the terminal device from the electronic device and a magnitude relation among received signal strength of corresponding SSBs received by the terminal device from a base station of a neighbor cell being both substantially unchanged, within the predetermined time period under the connected state.

(27) An electronic device of (24) or (25), wherein, the processing circuitry is further configured to:

receive measurements of the one or more SSBs from the terminal device;

determine, based on the received measurements, whether a variation of received signal strength of any SSB of the one or more SSBs with respect to received signal strength of the corresponding SSB before the terminal device entering the idle state or the inactive state is higher than the first threshold; and in response to determining that the variation being higher than the first threshold, notify one or more terminal devices under an idle state or an inactive state that are geographically close and whose beam measurements are close to the terminal device, such that the one or more terminal devices perform measurement on corresponding one or more SSBs in every paging period respectively.

(28) An electronic device of (24) or (25), wherein, the configuration information further comprises information indicating a predetermined period, the predetermined period includes M paging periods, M being an integer multiple of N, and the predetermined period causing the terminal device to:

every time the predetermined period passes during performing measurement on the one or more SSBs according to the SSB measurement timing, transition from performing measurement on the one or more SSBs according to the SSB measurement timing to performing measurement on the one or more SSBs in every paging period, and in the case of the one or more SSBs being measured in every paging period, restore to perform measurement on the one or more SSBs according to the SSB measurement timing in response to, for a predetermined number of consecutive measurements, a variation of received signal strength of each SSB of the one or more SSBs with respect to received signal strength measured at a previous time being all less than or equal to the first threshold.

(29) The electronic device of (24) or (25), wherein, the configuration information further comprises information indicating a third threshold, and the third threshold indicates: during the terminal device being under the idle state or the inactive state, performing measurement only on one or more SSBs which have received signal strength higher than the third threshold when the terminal device is under a connected state.

(30) The electronic device of (25), wherein the processing circuitry determines any two terminal devices as geographically close: the difference in received signal strength of corresponding SSBs received by the two terminal devices from the electronic device and the difference in received signal strength of corresponding SSBs received from base stations of two neighbor cells being all less than a fourth threshold; and the processing circuitry determines any two terminal devices as having close beam measurements: a magnitude relation among received signal strength of corresponding SSBs received by the two terminal devices from the electronic device and a magnitude relation among received signal strength of corresponding SSBs received from a base stations of a neighbor cell being both consistent.

(31) A method for a control device side of a wireless communication system, comprising:

determining if a terminal device is in a stationary status; and in response to determining the terminal device is in the stationary status, transmitting, to the terminal device, configuration information indicating performing measurement on one or more Synchronization Signal Blocks, SSBs corresponding to the terminal device when the terminal device is under an idle state or an inactive state, wherein the configuration information at least comprises information indicating SSB measurement timing and information indicating a first threshold, and the SSB measurement timing is within a paging period of every N paging periods, N being an integer greater than 1, such that the terminal device, during being under the idle state or the inactive state:

performs measurement on the one or more SSBs according to the SSB measurement timing, and performs measurement on the one or more SSBs in every paging period in response to a variation of received signal strength of any of the measured one or more SSBs with respect to received signal strength measured at a previous time being higher than the first threshold.

(32) Anon-transitory computer readable storage medium having executable instructions stored thereon, which, when executed, implement the method of any one of (1), (14), (23) and (31).

(33) A device comprising:

a processor, a storage having executable instructions stored thereon, which, when executed, implement the method of any one of (7), (14), (23) and (31).

The invention claimed is:

1. An electronic device for a terminal device side of a wireless communication system, comprising:

a processing circuitry, configured to:

receive, from a base station, configuration information indicating to perform, when the electronic device is under an idle state or an inactive state, measurement on one or more Synchronization Signal Blocks, SSBs of a plurality of SSBs corresponding to the electronic device, wherein the configuration information is transmitted based on the electronic device being in a stationary status, and the configuration information at least comprises information indicating a first threshold; and perform the measurement, while the electronic device is under the idle state or the inactive state, only on one or more SSBs of the plurality of SSBs which have received signal strength measured in a connected state higher than the first threshold, wherein the stationary status indicates the electronic device is not displaced and is not rotated, wherein the electronic device is determined to be not displaced at least based on, within a predetermined time period under the connected state, a variation, relative to a previous signal strength measurement, in received signal strength of each SSB of corresponding SSBs received by the electronic device from the base station of a serving cell and in received signal strength of each SSB of corresponding SSBs received by the electronic device from base stations of two neighbor cells, the variations being all less than a second threshold, and wherein the electronic device is determined to be not rotated at least based on, within the predetermined time period under the connected state, a magnitude relationship among received signal strength of the corresponding SSBs received by the electronic device from the base station of the serving cell and a magnitude relationship among received signal strength of corresponding SSBs received by the electronic device from a base station of a neighbor cell remaining substantially unchanged.

2. The electronic device of claim 1, wherein the configuration information further comprises information indicating a third threshold, and the processing circuitry is further configured to perform a measurement on each SSB of the plurality of SSBs corresponding to the electronic device in response to detecting, while the electronic device is under the idle state or the inactive state, that a variation in received signal strength of any SSB of the one or more SSBs measured, relative to a previous signal strength measurement, is higher than the third threshold.

3. The electronic device of claim 1, wherein the processing circuitry is further configured to transmit information assisting in a determination of the stationary status to the base station, the information assisting in the determination of the stationary status comprising at least information indicating a type of the electronic device and/or information related to received signal strength of historical downlink reference signals.

4. The electronic device of claim 1, wherein the configuration information further comprises information indicating SSB measurement timing and information indicating a fourth threshold, and the SSB measurement timing is within a paging period of every N paging periods, N being an integer greater than 1; and the processing circuitry is further configured to, while the electronic device is under the idle state or the inactive state:

perform a measurement on the one or more SSBs according to the SSB measurement timing, and perform an SSB measurement in every paging period in response to detecting that a variation of received signal strength of any of the measured one or more SSBs, relative to a previous signal strength measurement, is higher than the fourth threshold.

5. A method for a terminal device side of a wireless communication system, comprising:

receiving, from a base station, configuration information indicating to perform, when the electronic device is under an idle state or an inactive state, measurement on one or more Synchronization Signal Blocks, SSBs of a plurality of SSBs corresponding to the terminal device, wherein the configuration information is transmitted based on the terminal device being in a stationary status, and the configuration information at least comprises information indicating a first threshold; and performing the measurement, while the electronic device is under the idle state or the inactive state, only on one or more SSBs of the plurality of SSBs which have received signal strength measured in a connected state higher than the first threshold, wherein the stationary status indicates the electronic device is not displaced and is not rotated, wherein the electronic device is determined to be not displaced at least based on, within a predetermined time period under the connected state, a variation, relative to a previous signal strength measurement, in received signal strength of each SSB of corresponding SSBs received by the electronic device from the base station of a serving cell and in received signal strength of each SSB of corresponding SSBs received by the electronic device from base stations of two neighbor cells, the variations being all less than a second threshold, and wherein the electronic device is determined to be not rotated at least based on, within the predetermined time period under the connected state, a magnitude relationship among received signal strength of the corresponding SSBs received by the electronic device from the base station of the serving cell and a magnitude relationship among received signal strength of corresponding SSBs received by the electronic device from a base station of a neighbor cell remaining substantially unchanged.

6. An electronic device for a control device side of a wireless communication system, comprising:

a processing circuitry configured to:

determine if a terminal device is in a stationary status; and in response to determining the terminal device is in the stationary status, transmit, to the terminal device, configuration information indicating to perform, when the terminal device is under an idle state or an inactive state, measurement on one or more Synchronization Signal Blocks, SSBs of a plurality of SSBs corresponding to the terminal device, wherein the configuration information at least comprises information indicating a first threshold, such that the terminal device performs the measurement, while the terminal device is under the idle state or the inactive state, only on one or more SSBs of the plurality of SSBs which have received signal strength measured in a connected state higher than the first threshold, wherein the stationary status indicates the terminal device is not displaced and is not rotated, wherein the processing circuitry determines the terminal device to be not displaced at least based on, within a predetermined time period under the connected state, a variation, relative to a previous signal strength measurement, in received signal strength of each SSB of corresponding SSBs received by the terminal device from the electronic device and in received signal strength of each SSB of corresponding SSBs received by the terminal device from base stations of two neighbor cells, the variations being all less than a second threshold, and wherein the processing circuitry determines the terminal device to be not rotated at least based on, within the predetermined time period under the connected state, a magnitude relationship among received signal strength of the corresponding SSBs received by the terminal device from the electronic device and a magnitude relationship among received signal strength of corresponding SSBs received by the terminal device from a base station of a neighbor cell remaining substantially unchanged.

7. The electronic device of claim 6, wherein the configuration information further comprises information indicating a third threshold, wherein the third threshold indicates: if a variation of received signal strength of any SSB of the one or more SSBs measured while the terminal device is under the idle state or the inactive state, is higher than the third threshold, relative to a previous signal strength measurement.

8. The electronic device of claim 6, wherein the processing circuitry is further configured to:

receive information assisting in a determination of a stationary status from the terminal device, the information assisting in the determination of the stationary status comprising at least information indicating a type of the terminal device and/or information related to received signal strength of historical downlink reference signals, and determine whether the terminal device is in the stationary status is also based on the information assisting in the determination of the stationary status.

9. The electronic device of claim 6, wherein the configuration information further comprises information indicating SSB measurement timing and information indicating a fourth threshold, and the SSB measurement timing is within a paging period of every N paging periods, N being an integer greater than 1, so that the terminal device is configured to, under the idle state or the inactive state:

perform a measurement on the one or more SSBs according to the SSB measurement timing, and perform an SSB measurement in every paging period in response to detecting that a variation of received signal strength of any of the measured one or more SSBs, relative to a previous signal strength measurement, is higher than the fourth threshold.

10. A method for a control device side of a wireless communication system, comprising:

determining if a terminal device is in a stationary status; and in response to determining the terminal device is in the stationary status, transmitting, to the terminal device, configuration information indicating to perform, when the terminal device is under an idle state or an inactive state, measurement on one or more Synchronization Signal Blocks, SSBs of a plurality of SSBs corresponding to the terminal device, wherein the configuration information at least comprises information indicating a first threshold, such that the terminal device performs the measurement, while the terminal device is under the idle state or the inactive state, only on one or more SSBs of the plurality of SSBs which have received signal strength measured in a connected state higher than the first threshold, wherein the stationary status indicates the terminal device is not displaced and is not rotated, wherein the terminal device is determined to be not displaced at least based on, within a predetermined time period under the connected state, a variation, relative to a previous signal strength measurement, in received signal strength of each SSB of corresponding SSBs received by the terminal device from the electronic device and in received signal strength of each SSB of corresponding SSBs received by the terminal device from base stations of two neighbor cells, the variations being all less than a second threshold, and wherein the terminal device is determined to be not rotated at least based on, within the predetermined time period under the connected state, a magnitude relationship among received signal strength of the corresponding SSBs received by the terminal device from the electronic device and a magnitude relationship among received signal strength of corresponding SSBs received by the terminal device from a base station of a neighbor cell remaining substantially unchanged.

11. An electronic device for a terminal device side of a wireless communication system, comprising:

a processing circuitry configured to:

receive, from a base station, configuration information indicating to perform a measurement on one or more Synchronization Signal Blocks, SSBs corresponding to the electronic device when the electronic device is under an idle state or an inactive state, wherein the configuration information is transmitted based on the terminal device being in a stationary status, and the configuration information at least comprises information indicating SSB measurement timing and information indicating a first threshold, and the SSB measurement timing is within a paging period of every N paging periods, N being an integer greater than 1; and while the electronic device is under the idle state or the inactive state:

perform a measurement on the one or more SSBs according to the SSB measurement timing, and perform a measurement on the one or more SSBs in every paging period in response to detecting that a variation of received signal strength of any of the measured one or more SSBs, relative to a previous signal strength measurement, is higher than the first threshold, wherein the SSB measurement timing is determined based on a group of terminal devices including the electronic device, wherein the group of electronic devices includes a plurality of terminal devices that are geographically close and that have beam measurements that are close, or wherein the configuration information further comprises information indicating a predetermined period, the predetermined period including M paging periods, M being an integer multiple of N, and the processing circuitry is further configured to:

every time the predetermined period passes during performing measurement on the one or more SSBs according to the SSB measurement timing, transition from performing the measurement on the one or more SSBs according to the SSB measurement timing to performing the measurement on the one or more SSBs in every paging period, and in the case of the one or more SSBs being measured in every paging period, in response to a variation, relative to a previous signal strength measurement, of received signal strength of any SSB of the one or more SSBs, measured while the electronic device is under the idle state or the inactive state, being less than or equal to the first threshold, perform a measurement on the one or more SSBs according to the SSB measurement timing.

12. The electronic device of claim 11, the processing circuitry is further configured to:

in response to detecting that a variation of received signal of any of the measured one or more SSBs strength, relative to a previous signal strength measurement, is greater than the first threshold, switch the electronic device from the idle state or the inactive state to the connected state and transmit the measurements of the one or more SSBs to the base station, such that the base station notifies one or more terminal devices under an idle state or an inactive state to perform measurement on one or more SSBs corresponding to a respective terminal device in every paging period, wherein the one or more terminal devices are geographically close to the electronic device and have beam measurements that are close to that of the electronic device.

13. An electronic device for a control device side of a wireless communication system, comprising:

a processing circuitry configured to:

determine if a terminal device is in a stationary status; and in response to determining the terminal device is in the stationary status, transmit, to the terminal device, configuration information indicating to perform a measurement on one or more Synchronization Signal Blocks, SSBs corresponding to the terminal device when the terminal device is under an idle state or an inactive state, wherein the configuration information at least comprises information indicating SSB measurement timing and information indicating a first threshold, and the SSB measurement timing is within a paging period of every N paging periods, N being an integer greater than 1, such that the terminal device is configured to, while under the idle state or the inactive state:

perform a measurement on the one or more SSBs according to the SSB measurement timing, and perform an measurement on the one or more SSBs in every paging period in response to detecting that a variation of received signal strength of any of the measured one or more SSBs, relative to a previous signal strength measurement, is higher than the first threshold, wherein the processing circuitry is further configured to:

divide a plurality of terminal devices that are geographically close to the electronic device and whose beam measurements are close into a group of terminal devices; and determine the SSB measurement timing for each terminal device in each group of terminal devices based on the grouping result, or wherein the configuration information further comprises information indicating a predetermined period, the predetermined period includes M paging periods, M being an integer multiple of N, and the predetermined period causing the terminal device to:

every time the predetermined period passes during performing measurement on the one or more SSBs according to the SSB measurement timing, transition from performing measurement on the one or more SSBs according to the SSB measurement timing to performing the measurement on the one or more SSBs in every paging period, and in the case of the one or more SSBs being measured in every paging period, restore to in response to, for a predetermined number of consecutive measurements, a variation of received signal strength of each SSB of the one or more SSBs with respect to received signal strength measured at a previous time being all less than or equal to the first threshold, perform a measurement on the one or more SSBs according to the SSB measurement timing.

14. The electronic device of claim 13, wherein,
the processing circuitry is further configured to:
receive measurements of the one or more SSBs from the terminal device;
determine, based on the received measurements, whether a variation of received signal strength of any SSB of the one or more SSBs, relative to a previous signal strength measurement, before the terminal device entering the idle state or the inactive state, is higher than the first threshold; and
in response to determining that the variation being higher than the first threshold, notify one or more terminal devices under an idle state or an inactive state that are geographically close and that have beam measurements are close to the terminal device, such that the one or more terminal devices perform measurement on corresponding one or more SSBs in every paging period respectively.

* * * * *